United States Patent [19]
Gupta et al.

[11] Patent Number: 5,490,280
[45] Date of Patent: Feb. 6, 1996

[54] APPARATUS AND METHOD FOR ENTRY ALLOCATION FOR A RESOURCE BUFFER

[75] Inventors: Shantanu R. Gupta, Beaverton; James S. Griffith, Aloha; Glenn J. Hinton, Portland, all of Oreg.

[73] Assignee: Intel Corporation, Santa Clara, Calif.

[21] Appl. No.: 267,776

[22] Filed: Jun. 28, 1994

Related U.S. Application Data

[63] Continuation-in-part of Ser. No. 40,659, Mar. 31, 1994.
[51] Int. Cl.⁶ ........................................ G06F 3/00
[52] U.S. Cl. .............. 395/800; 395/375; 364/DIG. 2; 364/939 D; 364/931.41; 364/931.11; 364/931.55
[58] Field of Search .................... 395/800, 375, 395/421.03, 414, 480, 497.4

[56] References Cited

U.S. PATENT DOCUMENTS

| | | | |
|---|---|---|---|
| 5,226,126 | 6/1993 | McFarland et al. | 395/375 |
| 5,345,569 | 9/1994 | Tran | 395/375 |

OTHER PUBLICATIONS

Johsen; *Superscalar Microprocessor Design*; 1991; Chapter 7.
Dwyer; "A Multiple Out of Order Instruction Issuing System for SuperScalar Processors" Chapter 3 1991.
Val Popescu, et al. entitled, "The Metaflow Architecture," IEEE Micro, Jun. 1991, pp. 10–13, 63–73.

*Primary Examiner*—Alyssa H. Bowler
*Assistant Examiner*—L. Donaghue
*Attorney, Agent, or Firm*—Blakely, Sokoloff, Taylor & Zafman

[57] ABSTRACT

A method and apparatus for allocating a number of vacant entries of a buffer resource and generating a set of enable vectors based thereon for a set of issued instructions. A deallocation vector of a reservation station is searched in order to locate, within one clock cycle, the vacancies within the reservation station for storage of instruction information associated with several issued operations. Vacancies are indicated by bits of the deallocation vector. A general static and dynamic approach are disclosed for performing the vacant entry identification at high speed within a single clock cycle. Alternate embodiments are disclosed, based on the general approach, that divide the deallocation vector into separate portions (consecutive bits or interleaved) and process each portion based on the general approaches. Rotating priority reference points within the deallocation vector may be used to vary the starting point for vacancy location. Further, the vacancy search can be limited to finding only consecutive vacancies. A superscalar microprocessor using the above may, within one clock cycle, schedule a group of instructions from the instruction decoder to the reservation station for subsequent execution.

44 Claims, 15 Drawing Sheets

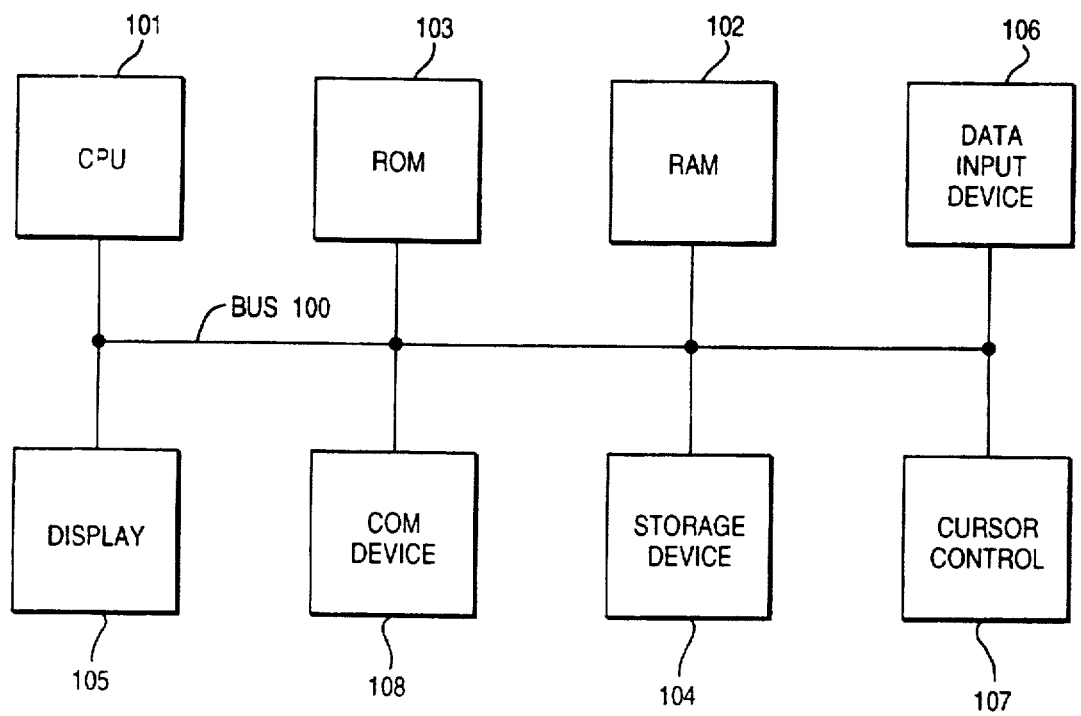
FIG_1A

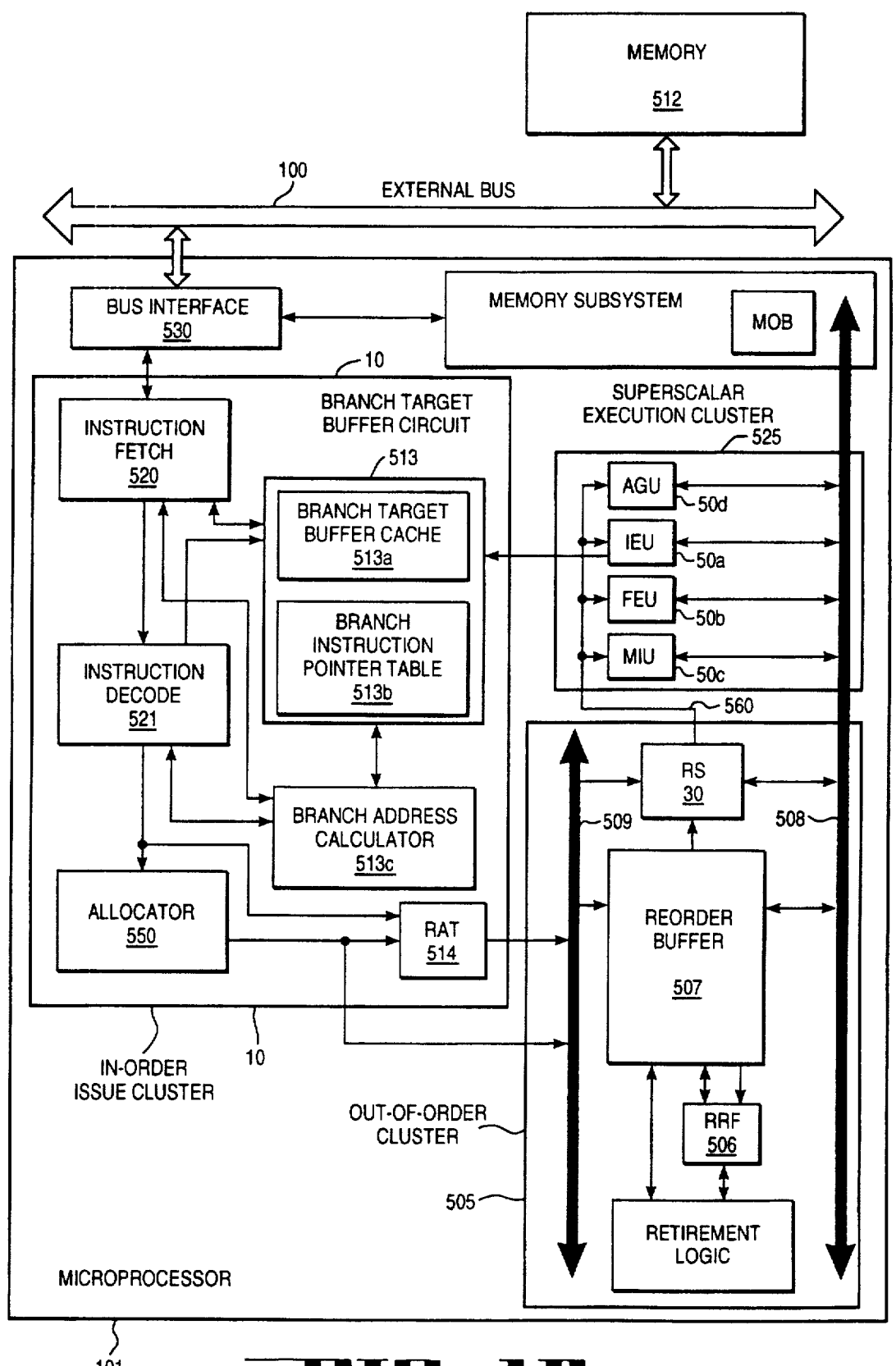
FIG_1B

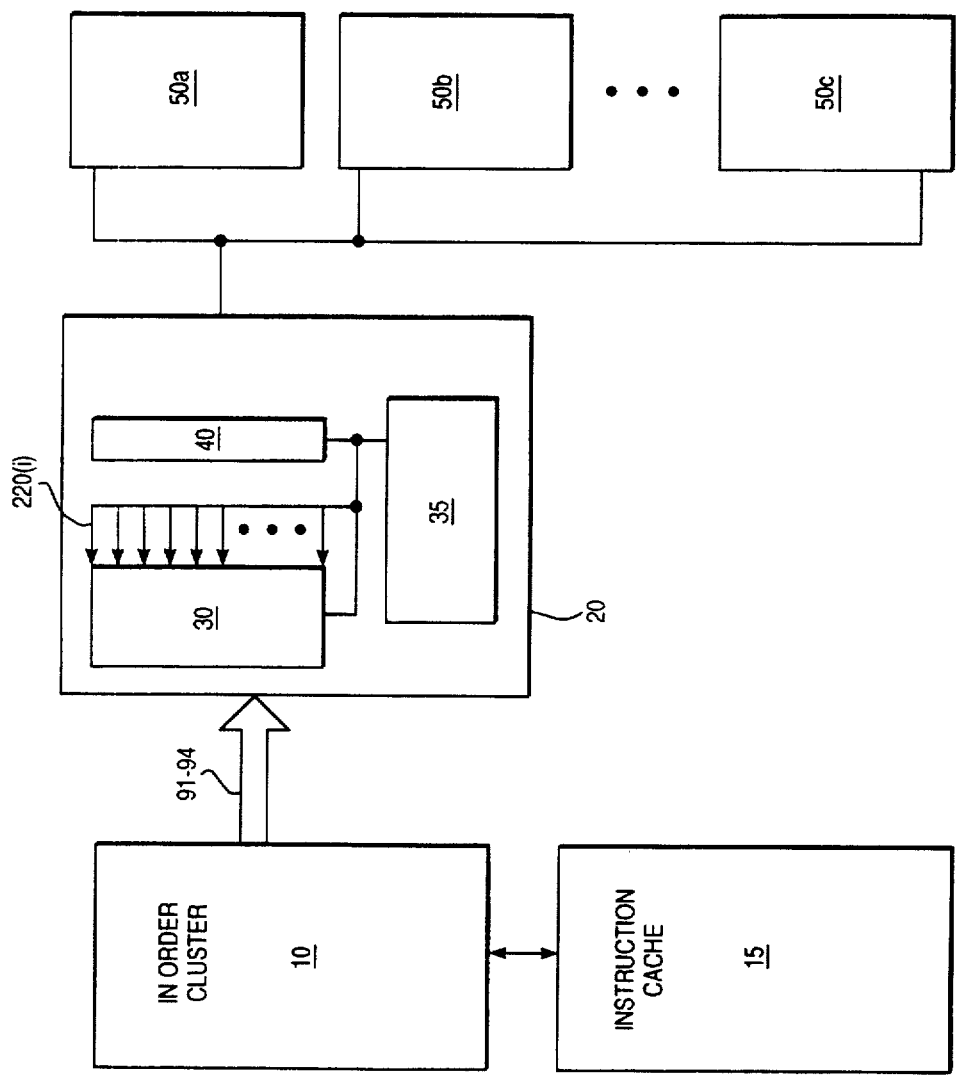

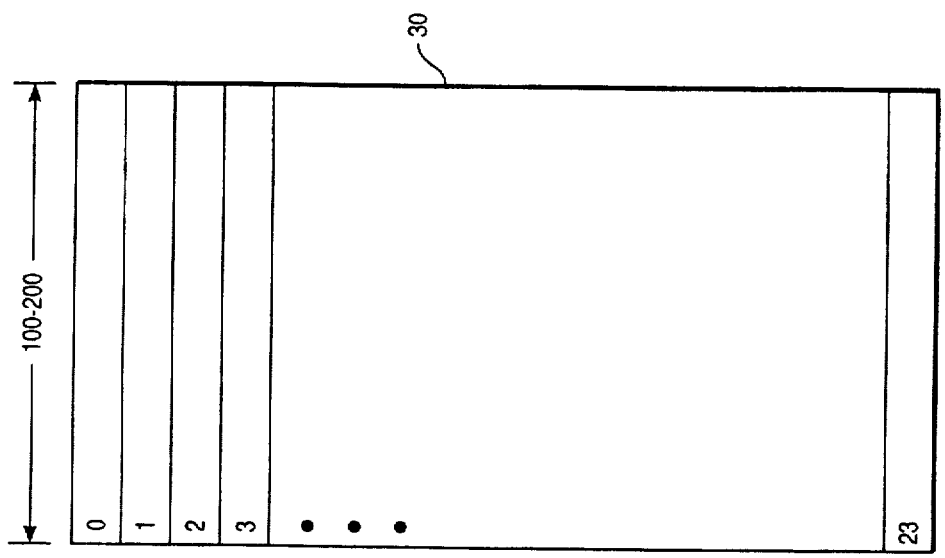
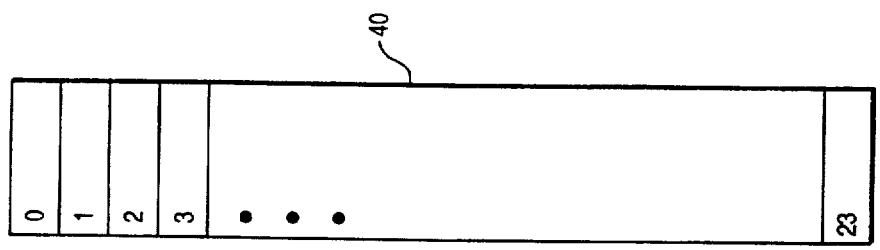
FIG_22

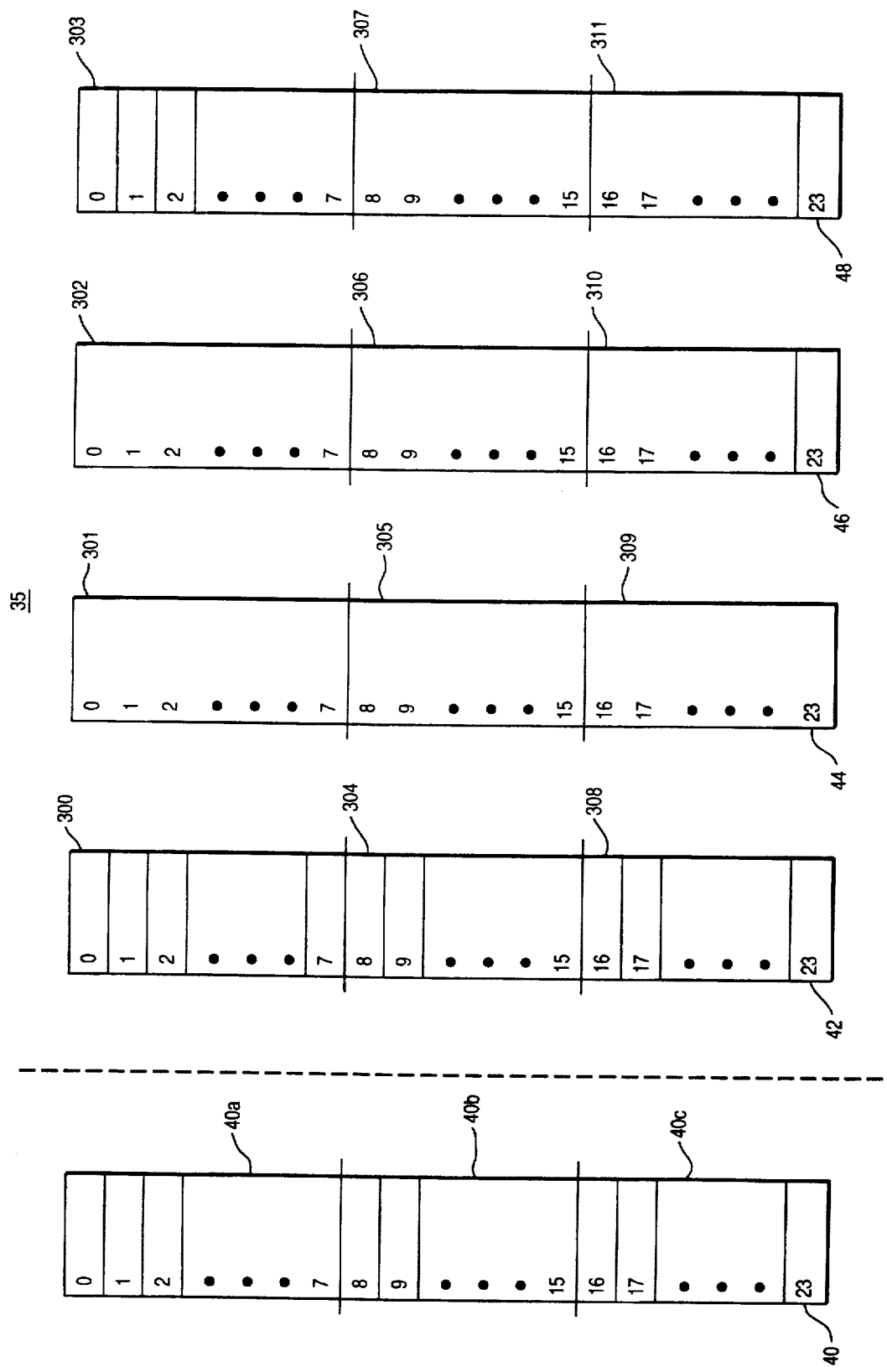
FIG_3

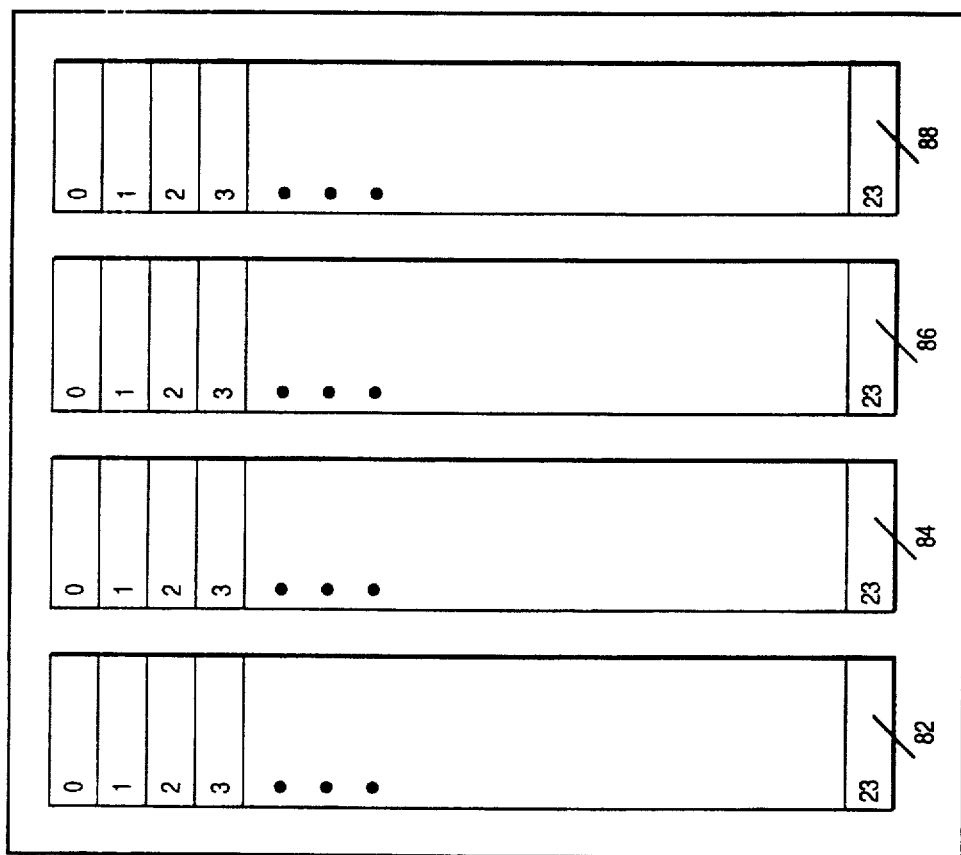
FIG_4

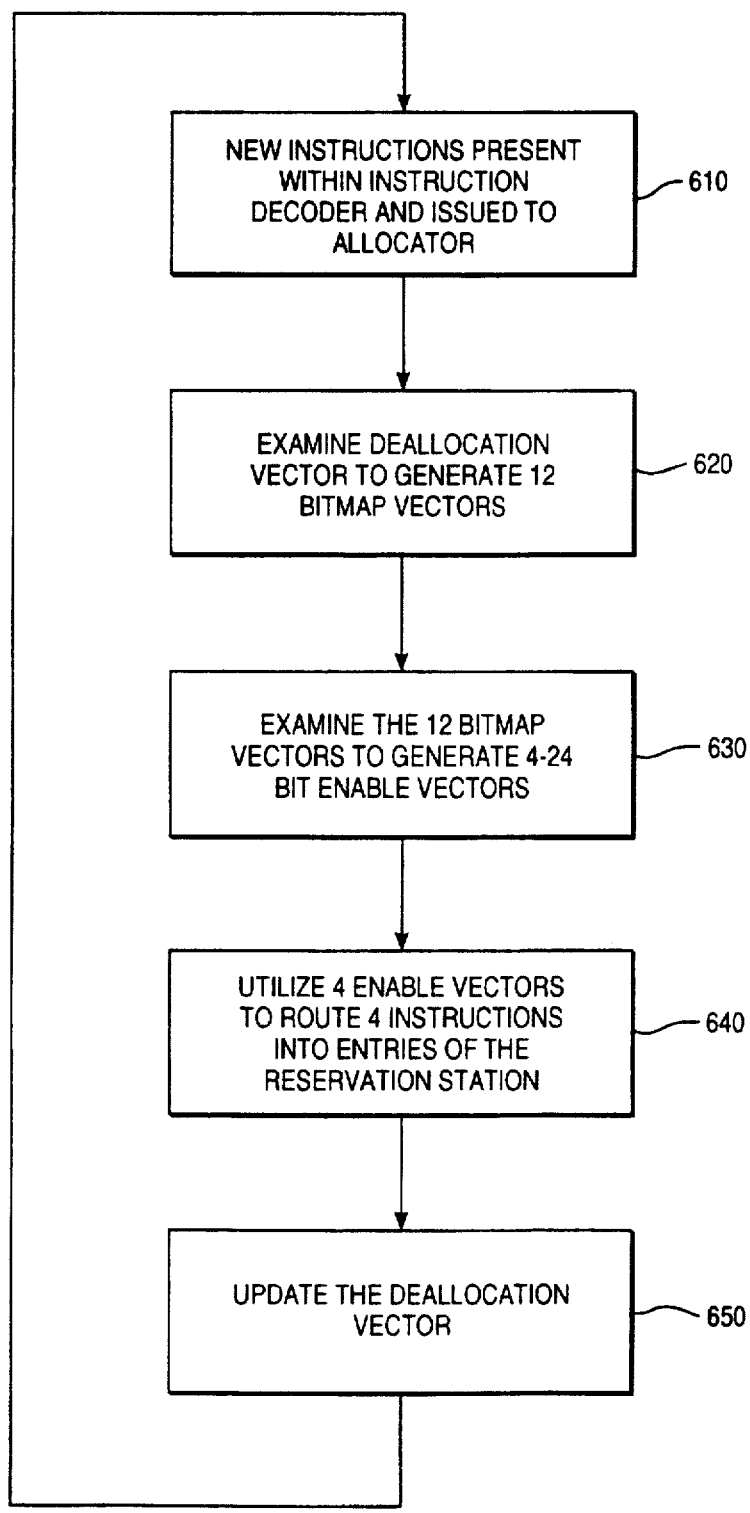
FIG_6

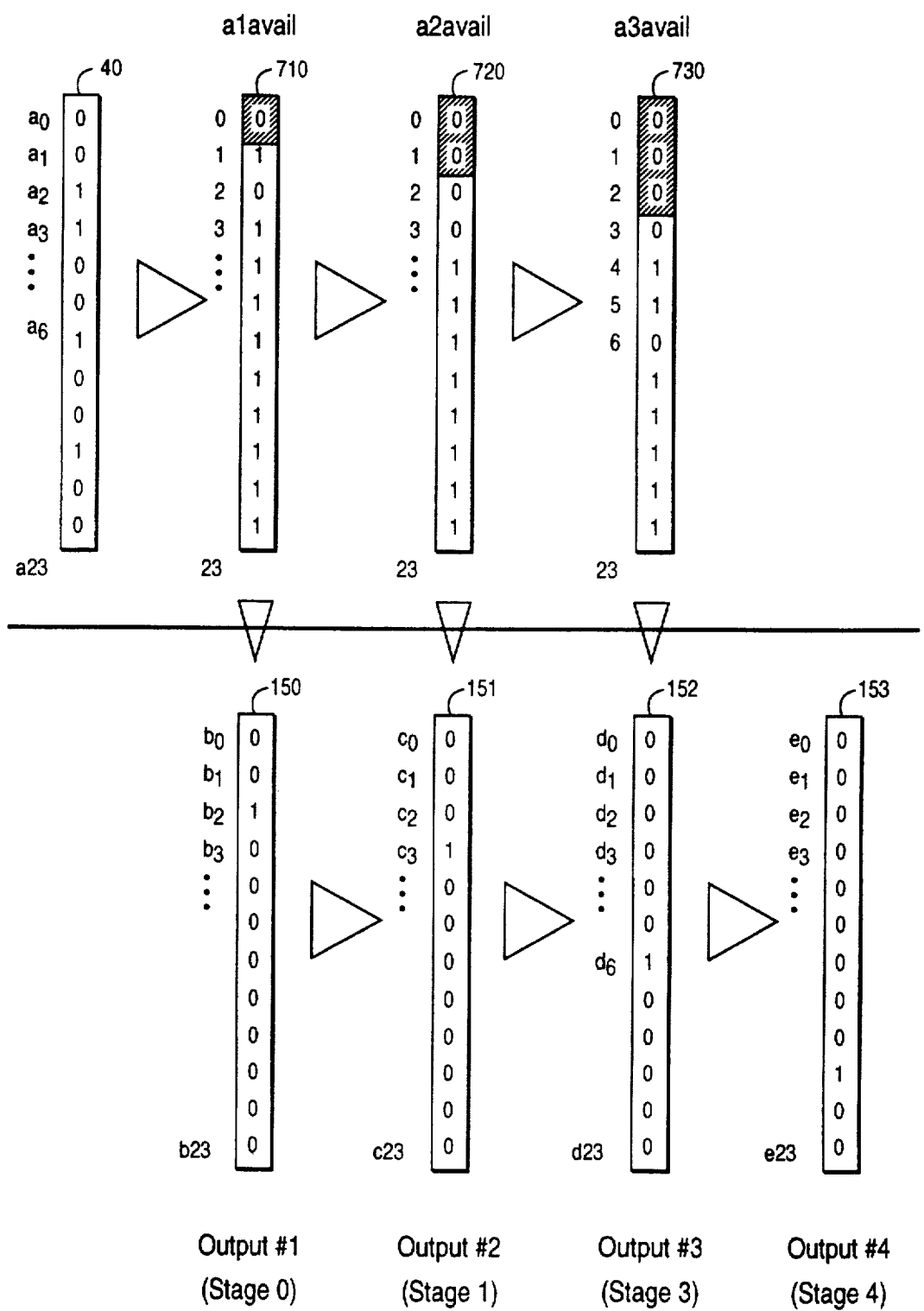
FIG_7

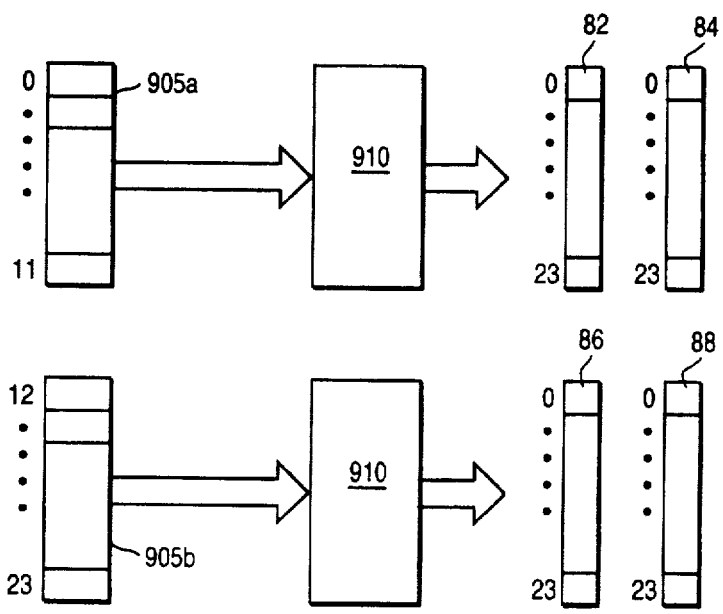
FIG_9A
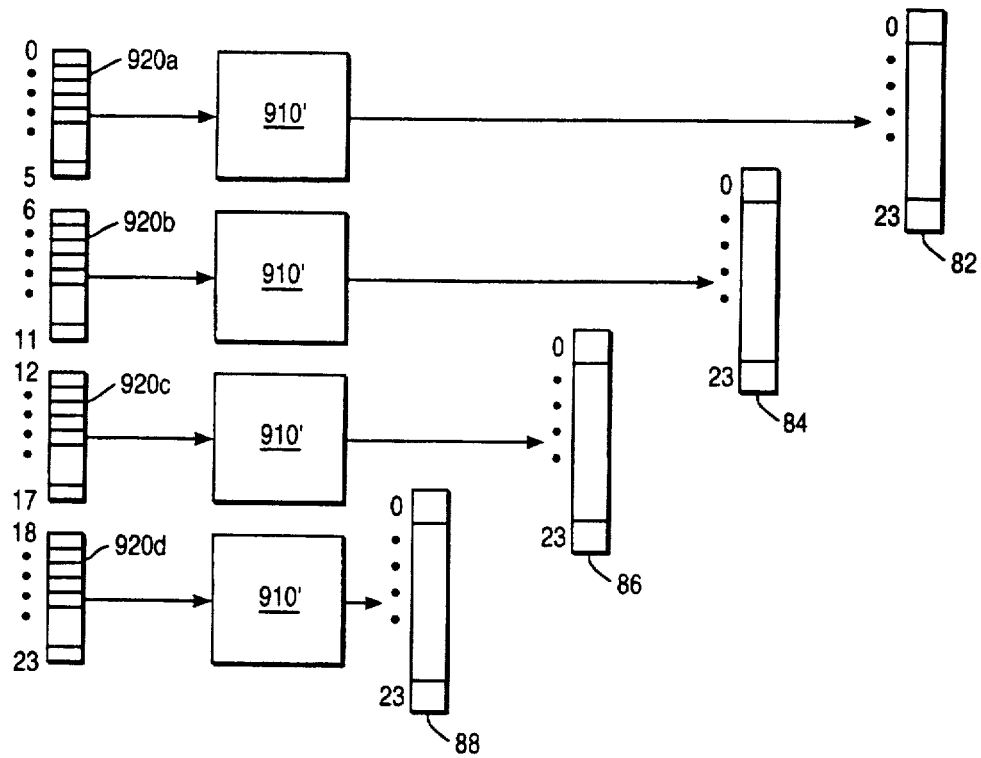
FIG_9B

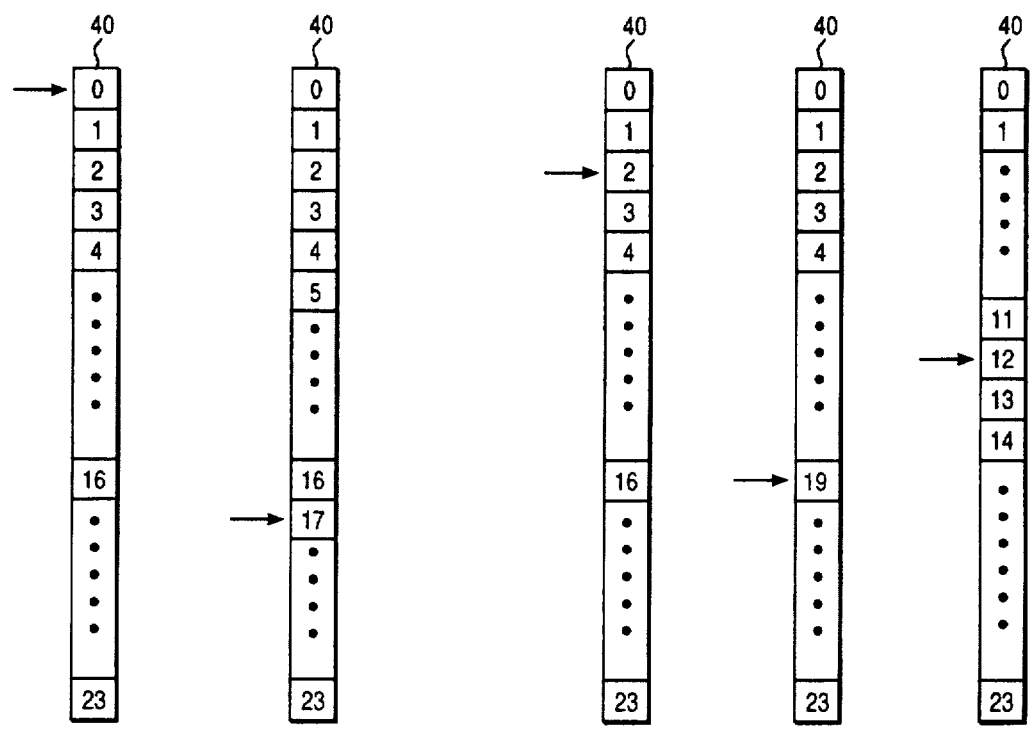
FIG_10A   FIG_10B
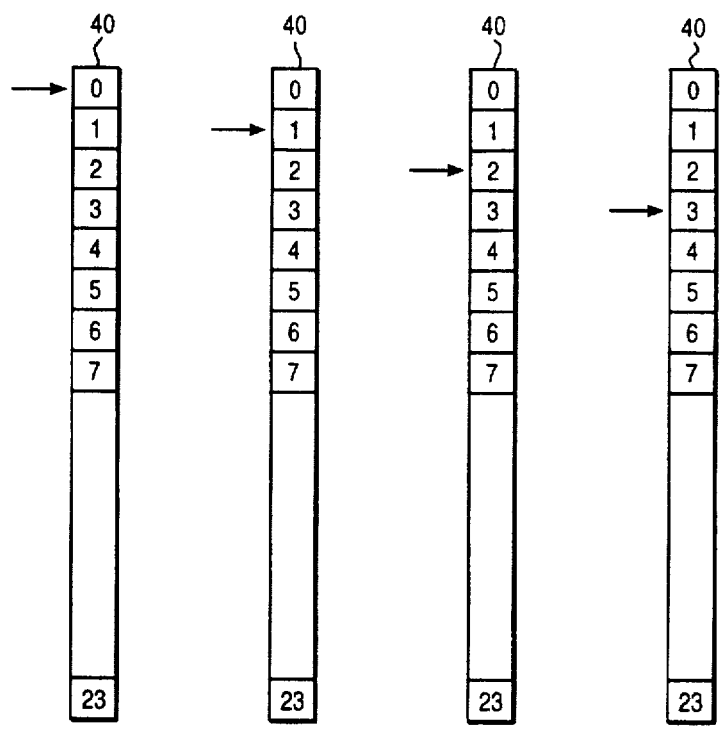
FIG_10C

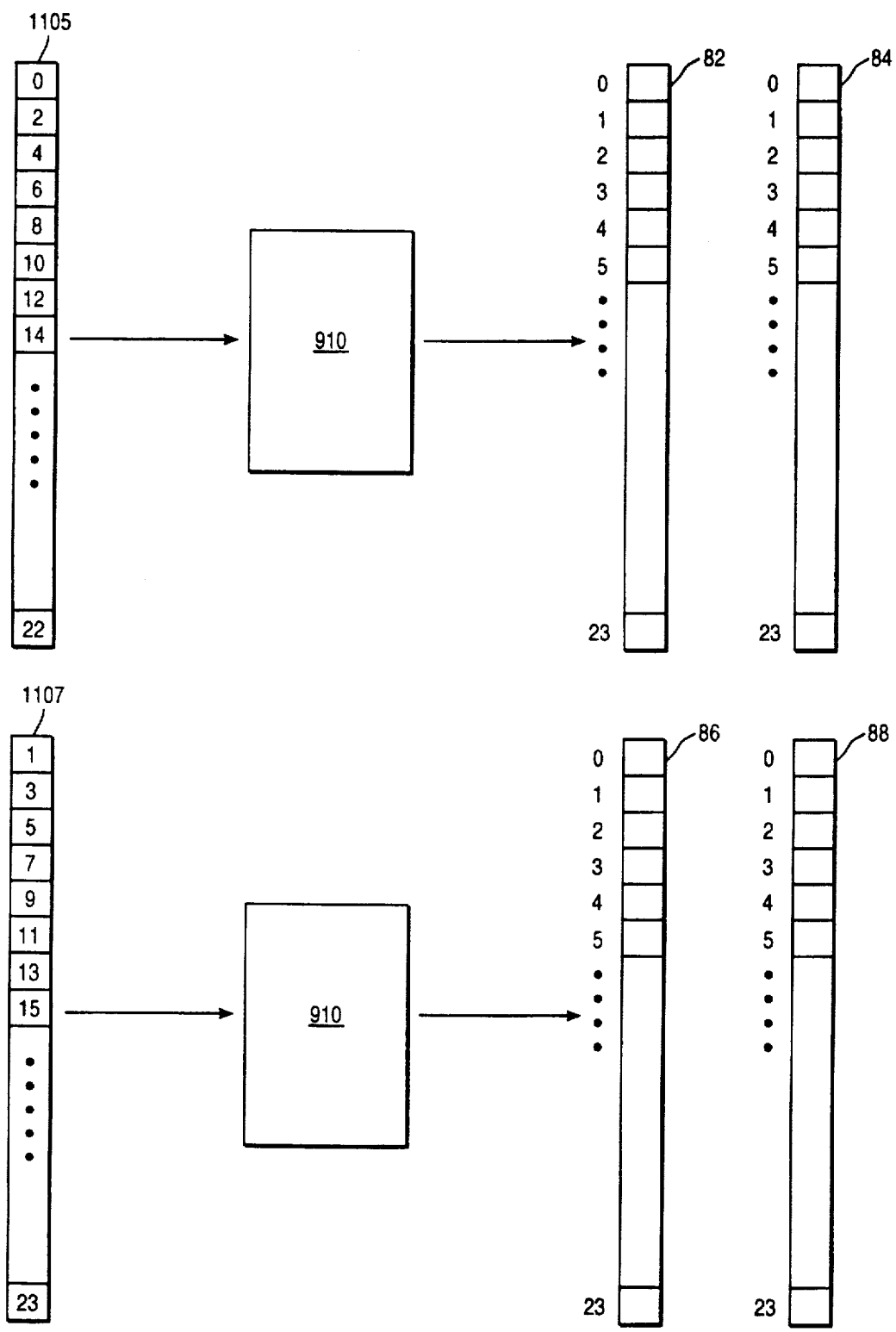
FIG_11

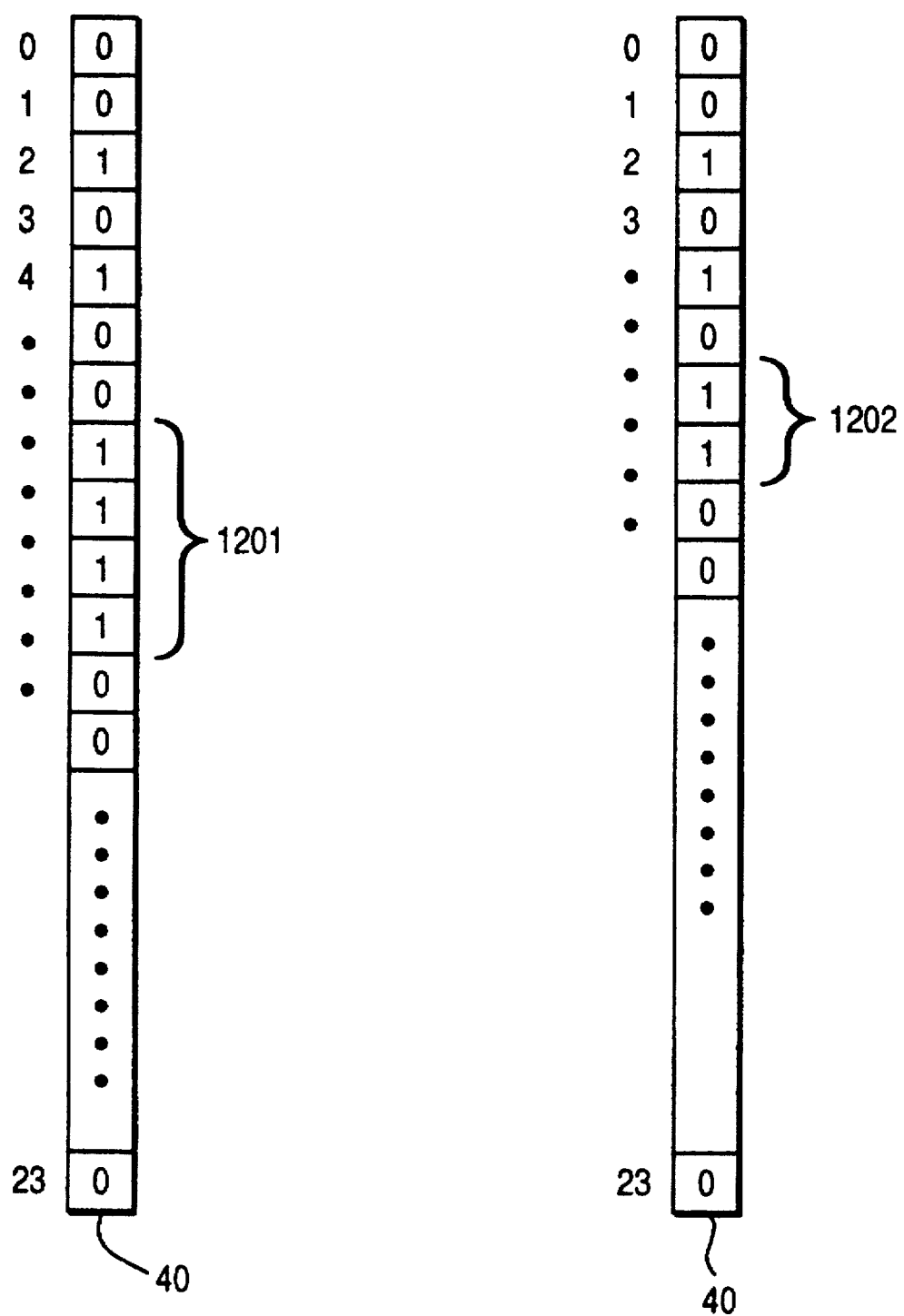
FIG_12

5,490,280

APPARATUS AND METHOD FOR ENTRY ALLOCATION FOR A RESOURCE BUFFER

RELATED U.S. APPLICATION

The present invention is a continuation-in-part of application Ser. No. 08/040,659 filed on Mar. 31, 1994 and entitled "ENTRY ALLOCATION APPARATUS AND METHOD OF SAME," and assigned to the assignee of the present invention.

BACKGROUND OF THE INVENTION (1) Field of the Invention

The present invention relates to the field of searching entries within an allocation vector to discover vacant locations of a resource buffer. Specifically, the present invention relates to the field of searching an entry vector, or portions thereof, using various search approaches for a predetermined number of vacant entries within a reservation station buffer.

(2) Prior Art

Modem microprocessors are gaining the ability to execute portions of several instructions in parallel during a single clock cycle. These microprocessors are called superscalar microprocessors and have pipelined and/or superscalar architecture. In effect, different stages of execution can be perforated by a microprocessor during a single clock cycle for several different microprocessor instructions. For this reason and others, microprocessors having this ability must be able to keep track of and store information regarding several instructions at the same time and communicate this information to and from several different portions of the microprocessor in a parallel fashion. Also, because of the high operating frequencies of modem pipelined microprocessors, this instruction information must be transmitted very quickly, usually during a single clock cycle of an oscillator operating at 150–200 Megahertz. Therefore, it becomes advantageous to be able to communicate instructions and instruction data very quickly in a parallel fashion to the various units of a microprocessor.

One component within a microprocessor that must receive information regarding instructions that are to be executed by a microprocessor is the instruction scheduler. The instruction scheduler holds information regarding the current instructions that are being executed as well as any data or information that is used by or in conjunction with the current instructions. The instruction scheduler has a finite memory storage capacity. Therefore, new and recent instruction information that is to be placed into the scheduler by the microprocessor must first obtain enough memory location vacancies within the instruction scheduler. That is to say, there must first be room within the scheduler before instruction information can be placed into the instruction scheduler.

A specialized deallocation vector is used by the instruction scheduler in order to indicate to the microprocessor which entries in the instruction scheduler are free and which are taken. In prior art implementations, the microprocessor would scan, one by one, each entry in the deallocation vector to locate one particular free entry of the instruction scheduler in order to store recent instruction data. However, with the introduction of microprocessors having superscalar architecture, the microprocessor must be able to search, at the same instant, the deallocation vector for up to several free entries to store information regarding several instructions during the same clock cycle. Further, as the time period between clock cycles shortens as microprocessors become faster and faster, it is important that the deallocation vector be searched very quickly as to not delay the processing of the microprocessor. Also, prior art schemes processed buffer entries that become vacant in order. What is needed is a mechanism for locating entries from a buffer wherein instruction information becomes vacant out of order. The present invention provides such functionality.

Prior art implementations used to search a deallocation vector in order to find vacancies within the instruction scheduler do not operate fast enough to complete processing within only one clock cycle (which may be on the order of $1/150^{th}$ of a microsecond) or within one half clock cycle (which may be $1/300^{th}$ of a microsecond) of modern superscalar microprocessors. It is not practical, given the environment of a pipelined microprocessor, to sequentially search each and every entry in a deallocation vector in order to discover, at the same instant, several vacant entries within the instruction scheduler. Since it is desired for pipelined microprocessors to execute portions of several instructions in parallel, it is unacceptable for there to be any delays associated with the search procedure of the deallocation vector of the instruction scheduler. This procedure must operate within a single clock cycle. Delays associated with such a task would reduce overall microprocessor efficiency and speed. Further, such processing delays may tend to eliminate the expansive advantages offered by microprocessors adopting pipeline architecture and associated microprocessor technology.

Therefore, what is desired is a processing scheme and apparatus that would allow very rapid searching of a deallocation vector in order to find, in one clock cycle, several vacant entries within an instruction scheduler. The present invention offers such advantageous capability.

Accordingly, it is an object of the present invention to provide a method and apparatus for searching a deallocation vector, within a single clock cycle, in order to locate several vacancies within a reservation station of an instruction scheduler. It is another object of the present invention to provide the above capability so that a pipelined architecture microprocessor can store instruction information for several instructions, which are or will be currently executed, into the instruction scheduler within the period one clock cycle. It is further an object of the present invention to provide such a system that operates very rapidly and will complete within one half of a clock cycle of the microprocessor, which may be less than $1/300^{th}$ of a microsecond.

It is an additional object of the present invention to provide the above using various alternate searching techniques. Other objects of the present invention not specifically mentioned herein will become clear within the remainder of the discussions below.

SUMMARY OF THE INVENTION

A method and apparatus for searching for a pattern of values indicating vacancy within entries of a reservation station. The present invention includes a method and apparatus for searching a deallocation vector of an instruction scheduler in order to locate, within one clock cycle, a pattern of vacancies within the instruction scheduler for storage of instruction information associated with several microprocessor instructions. Several searching techniques are disclosed in order to locate sufficient vacant entries for assignment to a group of instructions that are assigned to these entries in parallel. Alternate search strategies divide the deallocation vector into different sections and process each section independently using a general static or dynamic approach. The general approach advantageously locates the first four vacant entries of the deallocation vector which specify the first four vacancies within a reservation station of the instruction scheduler. The above processing is performed utilizing high speed parallel processing methods so that the entire searching, reporting and updating functions, with regard to the deallocation vector, can be completed within one clock cycle. Advantageously utilizing the present invention, a superscalar microprocessor may quickly and efficiently, within one clock cycle, schedule up to four instructions from the instruction decoder to the execution units of the microprocessor.

Specifically, embodiments of the present invention utilize the general static or general dynamic vacancy search mechanism but first divide the deallocation vector into portions, e.g., divide into two or divide into four, and send each portion to be simultaneously processed by separate vacancy search circuits. By reducing the number of vacancies the general static or general dynamic mechanisms must locate, the overall complexity of the circuitry is reduced. If the deallocation vector is split between two vacancy search circuits, then each circuit simultaneously generates a pair of enable vectors. The deallocation vector may be split into portions wherein the first portion comprises the even bits and the second portion comprises the odd bits; this is an interleaved split.

Other alternative embodiments of the present invention also include a priority pointer or head pointer that is used by the general static or the general dynamic vacancy search circuits of the present invention to vary the start priority bit which is used by the above vacancy search mechanisms. Using a rotating priority pointer, the start priority bit begins at zero (or any other arbitrary location) for a given clock cycle and will point to the bit following the last vacancy found in the last deallocation vector. Using a random priority pointer, the start priority bit varies randomly within the bits of the deallocation vector for each clock cycle. Using a step priority pointer, the start priority bit steps through the bits of the deallocation vector (e.g., by one, by two, by three, etc.) for each clock cycle. Further embodiments of the present invention utilize the vacancy search circuits of the general static and general dynamic approaches but are limited to locating a predetermined number of vacancies that are consecutive.

BRIEF DESCRIPTION OF THE DRAWINGS

FIG. 1A illustrates an overall computer system within which the present invention may operate.

FIG. 1B illustrates a processor of the present invention.

FIG. 1C is an illustration of the an interface between the processor of the present invention and the instruction scheduler of the present invention.

FIG. 2 is an illustration of the deallocation vector and reservation station of the present invention.

FIG. 3 illustrates the deallocation vector and the 12 bitmap vectors generated at an intermediate step of the present invention within the instruction scheduler.

FIG. 4 illustrates the multiplexing operation of the present invention to create four enable vectors.

FIG. 6 illustrates the major processing tasks performed by the allocation circuit 35 of the present invention.

FIG. 7 illustrates the processing stages of the dynamic implementation of the present invention.

FIG. 9A is an illustration of an embodiment of the present invention wherein the deallocation vector is split into two separate vectors and each portion is processed separately by the general vacancy location approaches of the present invention.

FIG. 9B illustrates an embodiment of the present invention that is similar to the embodiment of FIG. 9A and the deallocation vector is separated into four portions and processed.

FIG. 10A illustrates usage of rotating priority pointer of an embodiment of the present invention.

FIG. 10B illustrates usage of a random pointing priority pointer of an embodiment of the present invention.

FIG. 10C illustration a step pointing priority pointer of the present invention.

FIG. 11 illustrates an embodiment of the present invention that separates the deallocation vector into portions based on even and odd entries.

FIG. 12 illustrates embodiments of the present invention that search for consecutive group of vacant entries of the deallocation vector.

DETAILED DESCRIPTION OF THE INVENTION

Figure 5:
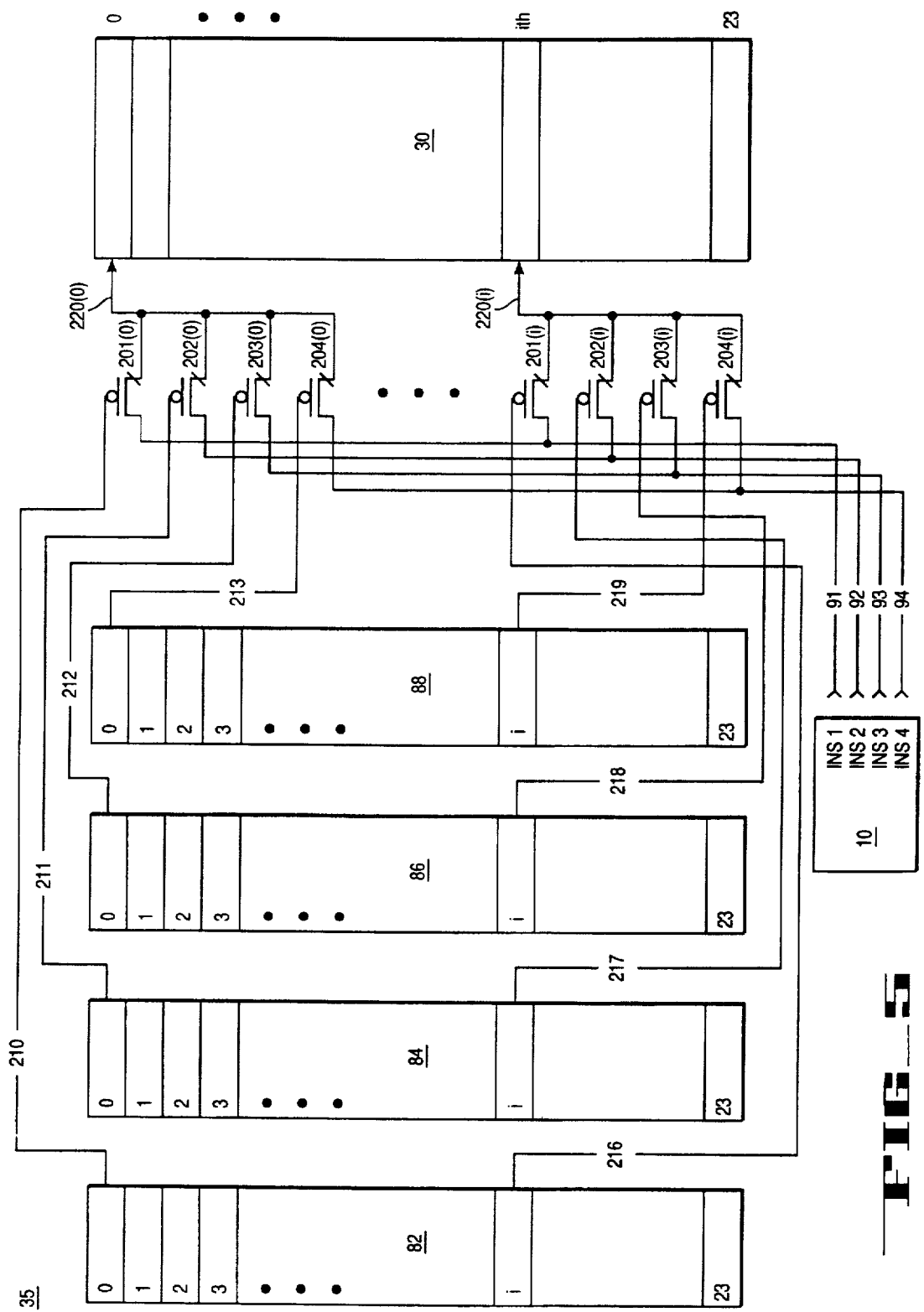
FIG. 5 illustrates coupling of the present invention between the four enable vectors, the reservation station memory and the instruction decoder.

In the following detailed description of the present invention, numerous specific details are set forth in order to provide a thorough understanding of the present invention. However, it will be obvious to one skilled in the art that the present invention may be practiced without these specific details. In other instances, well known methods, circuits, or components have not been described in detail as not to unnecessarily obscure the present invention. Throughout this detailed description, references are made to vectors. It is appreciated that all vectors of the present invention are implemented using either registers having a bit array or memory array components. That is, computation of vectors or utilization of specific vectors as related to the present invention is meant to refer to computation of or utilization of logical registers and/or physical memory locations constructed with hardware logic gates and physical quantities; to this extend, it is appreciated that the term "vector" is not meant to refer merely to a purely mathematical entity, but rather, what is meant is a vector implemented with specific hardware components and utilized by other hardware units to arrive at specific physical results and quantities.

I. INTRODUCTION

The present invention includes an apparatus and method for searching a deallocation vector in order to locate, within a half or single clock cycle, several vacancies within an reservation station for an allocation cycle (pipestage) of a processor's pipeline. The vacancies are allocated to a set of instructions and associated instruction information for this set of instructions that are issued within a common clock cycle and therefore need to be allocated within a common allocation cycle. Once the vacancies are found for a given allocation cycle, a front end or instruction issue unit can then load the vacant entries of the reservation station with several instructions that are ready for execution. Aspects of the present invention may be combined with a reservation station used for instruction scheduling within a microprocessor. The present invention operates within one clock cycle (within an allocation cycle) so as to not delay the processing of a pipelined microprocessor.

As described herein, a general approach for performing vacant entry identification, consisting of both a static and a dynamic embodiment is disclosed. Also, a computer system and a microprocessor system, both of the present invention, utilizing the general approach is disclosed. Lastly, alternate embodiments of the vacant entry identification are illustrated that are based on the general approach.

Specifically, the general approach includes an embodiment of the present invention utilizing static BiCMOs technology to implement a priority encoding scheme and will be used to search for "1s" or "0s" in a bit string vector the result of the search will be used to generate enables for a RAM array or reservation station. The general approach of the present invention is part static and part dynamic and generates 4 separate entry write enable vectors for the RAM in a very short period of time. The present invention is used to identify available RAM locations which are ready to receive instruction information. The present invention will directly activate write enable signals corresponding to the vacant entries of the RAM array. It is appreciated that the present invention can also be used to generate addresses of the vacant entries as well as directly activating write enables corresponding to these entries. Although the present invention is described as operating with four entries and with vectors and buffers of predetermined size, it is appreciated that the present invention is scalable and can easily be extended to include different sizes of the RAM array and associated enable vector.

II. COMPUTER SYSTEM

Refer to FIG. 1A. The present invention may operate within a pipelined architecture microprocessor. Such a microprocessor may be utilized within a computer system. Therefore, the present invention may be advantageously utilized increase the performance of an overall computer system. A computer system used by the preferred embodiment of the present invention is illustrated in block diagram format in FIG. 1A. This computer system comprises a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101.

It is appreciated that the microprocessor 101 advantageously utilized with the present invention, as described below, is a microprocessor having a pipelined architecture. Also, the microprocessor 101 may also be a superscalar microprocessor and may perform instructions out-of-order of their program sequence. Both of the above microprocessor types have the ability to execute portions of instructions or entire instructions in parallel. In either case or in both, the microprocessor must effectively deal with information regarding several instructions at the same time. The present invention may advantageously operate in conjunction with or as an integral part of these microprocessor types.

The display device 105 of FIG. 1A utilized with the computer system of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the an including a trackball, mouse, joystick or special keys on the alphanumeric input device 105 capable of signaling movement of a given direction or manner of displacement.

III. PROCESSOR

FIG. 1B illustrates a general block diagram of the processor 101 of the present invention. The components of the processor 101 are shown in FIG. 1B to provide the general structure and interface of the processor of the present invention. Generally, processor 101 is composed of an in-order portion 10 and an out-of-order portion 505 as shown. The branch target circuit 513, BTB cache 513*a*, branch instruction pointer 513*b* and the branch address calculator 513*c* perform speculative instruction execution by predicting program branch results to provide the pipeline with a steady source of instructions. The register alias table 514 performs register renaming and is the last stage of the in-order pipeline and subsequent to this stage instructions and association information are placed into the reservation station, RS, 30. Instructions that have been executed and are flowing from the out-of-order portion 505 retire to the real register file (RRF 506) in program code order if they are determined to be part of a properly predicted program pathway. The reorder buffer 507 contains information that may be part of a speculatively predicted branch. The out-of-order cluster 505 schedules operations for execution to the execution cluster 525, receives the results from the computations, and eventually updates the architecturally visible retirement register file (RRF) 506 with these results, assuming the computations are part of a properly predicted branch.

An external address and data bus 100, a writeback bus 508, dispatch bus 560, and internal bus 509 are also illustrated. The writeback bus 508 carries results of computations from the execution cluster 525 to the reorder buffer 507 which holds the results unit retirement. Dispatch bus 560 carries information relating to instructions dispatched from the reservation station to be executed within the execution cluster 525. Memory 512 (which may be of RAM 102 and/or ROM 103) for containing instruction and data information is coupled to bus 100 which is coupled to a bus interface unit 530.

The processor of FIG. 1B comprises instruction fetch 520 and decode 521 units with an integrated instruction cache 15 (shown in FIG. 1C). These instruction issue units are coupled to the bus interface 530 to receive instructions and data. The bus interface 530 is also coupled to a data cache memory. The instruction issue units (e.g., fetch and decode) are coupled to an allocator 550 which allocates entries of resource buffers, including the reorder buffer 507, the reservation station 30, and the register alias table 514. The entries of the reorder buffer 507 become vacant at the time of retirement and the entries of the reservation station become vacant at the time of dispatch. The allocator 530 and the instruction issue units are coupled to the RAT 514 which performs register renaming. The RAT 514 is coupled, via internal bus 509, to provide the reservation station 30 with instruction information for subsequent execution. The reservation station 30 is coupled to supply dispatched instruction information to the execution cluster 525, which includes an integer unit (IEU) 50a, a floating point unit (FEU) 50b, a memory unit (MIU) 50c, and an address generation unit (AGU) 50d.

The execution cluster 525 of the processor 101 includes execution units that hold and execute the integer and floating point instructions when their operand dependencies on execution results of preceding instructions are resolved, including those integer and floating point instructions that are speculatively fetched and issued. Similarly, the execution cluster 525 also includes a memory execution unit that holds, executes and dispatches load and store instructions to a data cache memory as soon as their operand dependencies on execution results of preceding instructions are resolved, including those load and store instructions that are speculatively fetched and issued.

The AGU 50d, IEU 50a, FEU 50b, and MIU 50d are all coupled to reservation station (RS) 30 via a dispatch bus 560. They are also coupled to writeback bus 508. RS 30 is coupled to the writeback bus 508 and the internal bus 509. The RS 30 is also coupled to ROB 507 and RRF 506. ROB 507 and RRF 506 are also coupled to the internal bus 509 and the writeback bus 508. Together, the above are coupled to hold, dispatch, execute and commit execution results of instructions. The instructions may be dispatched and executed out-of-order. Execution core 525 may include multiple IEUs, such as two, and multiple FEUs, such as two.

In operation, the instruction issue units 520 and 521 fetch instructions from an external memory, such as memory unit 512, through the bus interface 530 via bus 100. The fetched instructions are stored in an instruction cache 15 (shown in FIG. 1C). The bus interface 530 manages transfers of data between external components and the processor 101. In addition, it manages cache coherency transfers. The instruction issue units issue several instructions within a given clock cycle in program code order to the register alias table (RAT) 514 and the allocator 550.

The allocator 550 of the present invention interrogates a deallocation vector (generated by the reservation station 30) for vacant entries and from this vector assigns the issued instructions a vacant entry of the reservation station 30 for each uop. It is important that this interrogation of the deallocation vector to locate the vacant entries of the RS 30 is accomplished very rapidly, and not slower than one clock cycle. The allocator 550 also assigns each incoming uop (operation) to a vacant location (entry) in a reorder buffer (ROB) 507 and the RAT 514, thereby mapping the logical destination address (LDST) of the uop to a corresponding physical destination address (Pdst) in the ROB. A register alias table (RAT) 514 maintains this mapping for the most recently renamed logical destination registers. By renaming the registers used by the instructions to a larger set of physical registers that reside in the ROB, false data dependencies between instructions may be removed allowing additional 5parallel execution of instructions.

The out-of-order cluster 505 schedules the instructions for execution depending on data availability and other constraints. When the source data becomes available and an execution unit becomes free, an associated instruction within the reservation station 30 becomes eligible for dispatch to the execution cluster 525. The execution cluster 525 performs arithmetic and logic operations, such functions as add, subtract, logical AND, and integer multiply, as well as memory operations and returns the data to the out-of-order cluster 505. Some instructions are fetched and issued speculatively. The instruction issue units may issue a multiple number of instructions (e.g., 1, 2, 3, or 4) within a common clock cycle. Result data is then stored in the ROB 507.

The contents of a ROB register are retired to a location in a real register file (RRF) 506 in program code order when the register becomes part of a properly predicted program pathway. The ROB 507 maintains this program code order because the ROB 507 was filled by the in-order cluster 10. Since both the RRF 506 and the ROB 507 can be a source for operand data, the RAT 514 stores a real register file valid bit (RRFV) that indicates whether the value indicated by the logical address is to be found at the physical address in the ROB 507 or in the RRF 506 after retirement. Based upon this mapping, the RAT 514 also associates every logical source address to a corresponding location in the ROB 507 or the RRF 506 (the source operand of one instruction generally must have been the destination of a previous instruction).

RS 30 and ROB 507. Reservation station 30 of FIG. 1B receives and stores information pertaining to the issued instructions that are pending execution and resolves their operands with data from the IEU 50a, the FEU 50b, the data cache memory, the ROB 507 and RRF 506 and holds them until their operands are all resolved. The RS 30 then dispatches the issued instructions to the AGU 50d, the IEU 50a, the FEU 50b and the MIU 50c as appropriate. Each incoming uop is also assigned and written into an entry in the reservation station 30 by the allocator 550. The reservation station 30 assembles the instructions awaiting execution by an appropriate execution unit, such as integer execution unit. The use of register renaming in the ROB 507 not only avoids register resource dependencies to permit out-of-order execution, but also plays a role in speculative execution since the ROB contains only speculative data. If an instruction sequence is considered to be part of a predicted branch, then the execution of those instructions using the renamed registers in the ROB has no effect on the actual registers denoted by instruction. Thus, if it is determined that the branch was mispredicted, the results calculated and stored in the ROB may be erased and the pipeline flushed without affecting the actual registers found in the processor's register file (RRF). If the predicted branch affected the values in the RRF, then it would be difficult to recover from branch misprediction because it would be difficult to determine the values stored in the registers before the predicted branch was taken without the use of redundant registers in the ROB.

After execution within one of the execution units, when a result is produced, it is written to the ROB 507. The result may provide an input operand to one or more waiting instructions buffered in the reservation station, indicating that the source operand is ready for dispatch to one or more execution units along with the instructions using the operand. In the general case, instruction information held within the reservation station will source the ROB 507 to obtain operand data and this information is forwarded to the appropriate execution units for execution when an instruction is scheduled and dispatched. When the checking logic of the processor determines that a particular instruction is associated with a properly predicted branch, and all other conditions are satisfied, an instruction that has been executed and placed into the ROB 507 may retire. The associated physical register (Pdst) of that retiring instruction is then written into the RRF 506 and becomes architecturally visible. The IEU, FEU, and the MIU in turn perform their operations accordingly. The execution results of the integer, floating point and load instructions are held in the reorder buffer (ROB) 507, and then committed by RRF 506 in the order these instructions were issued. Speculative execution results of the mispredicted branches are not committed, but instead are held in the ROB 507 and deallocated upon their retirement.

Pipeline. Regarding the structure of the present invention processor 101, the following terminology describes the relevant processing stages of the instructions. The Issue stage refers to the merging of the in-order stream of instructions from the issue cluster with the corresponding source data which is provided by the ROB 507 and then placing this information into the reservation station 30. A set of four, or fewer, instructions are issued within a common clock cycle. Within the issue stage, registers used by the instruction are renamed to registers within the ROB 507 and this renaming occurs within the RAT 514. At the Issue stage, instructions may be part of a speculative program path as a result of a branch prediction. Also at the Issue stage, instruction information is allocated at an Allocation stage. During Allocation (e.g., during a given allocation cycle), the allocator 550 determines which entries of the reservation station are vacant (e.g., which ones were dispatched previously) and assigns these vacant entries to the set of newly issued instructions. The Ready/Schedule stage identifies all the instructions ready to execute (Ready stage) that are pending in the RS 30 a selects (Schedules) a group (e.g., by FIFO or similar process) for execution and also schedules an execution unit. For a given clock cycle, not all instructions that are ready are scheduled. At Dispatch, the scheduled instructions are forwarded to a selected execution (functional) unit. At Writeback, the results generated by the functional units are written into appropriate entries of the ROB 507. Also, the writeback ports are examined for results that are sources of instructions pending in the RS 30 so that the data-ready status of these pending instructions may be updated. At Retirement, the results from the ROB 507 that pertain to instructions that are properly predicted and also executed and placed into an architecturally visible buffer (the RRF) in their original issued order. Upon misprediction, the speculative data in the ROB 507 is cleared.

IV. INSTRUCTION SCHEDULER AND INTERFACE

Refer now to FIG. 1C which illustrates the instruction scheduler 20 of the present invention and its interface with the in-order cluster 10 of processor 101. An instruction cache unit 15 holds data regarding instructions for execution by the microprocessor 101 and is coupled to the in-order cluster 10 to supply instruction information; the instruction cache 15 may also be located within the issue units 520, 521. Instructions and associated instruction data fetched from the ROM 102 or RAM 103 are filled into the instruction cache unit 15 and the instruction cache unit 15 feeds current instructions and instruction data into the in-order cluster 10. The in-order cluster 10 of pipeline (or superscalar) microprocessor 101 will issue several instructions and associated data at the same time. The present invention operates within the environment wherein the in-order cluster 10 issues a set of up to four instructions and related data during a same clock cycle. It is appreciated that the system of the present invention can be extended to the cases where the instruction decoder issues more or less than four instructions simultaneously. Such extensions are within the scope of the present invention. It is appreciated that the in-order cluster 10 of the microprocessor of the present invention may issue instructions out of order of their original program sequence. This is done in an effort to increase processing efficiency by increasing parallelism. Instructions or operations with true data dependencies may not be issued out of order.

The instruction information associated with the set of four instructions issued by the microprocessor 101 at the in-order cluster 10 are fed to an instruction scheduler 20 that includes the reservation station buffer 30. The instruction scheduler 20 will store the instruction information until needed and will schedule execution of these instructions to the several execution units 50a to 50c as needed. The reservation station 30, in one embodiment, is a static RAM array of memory. En one embodiment, this reservation station 30 contains 24 entries numbered 0 to 23. Each entry is approximately 100 to 200 bits wide and is designed to hold both an instruction and all the data required for execution of that instruction.

The instruction scheduler 20 also contains and generates a deallocation vector 40 for each allocation cycle that contains 24 entries numbered 0 to 23. Each entry is only 1 bit wide and corresponds to an entry of the RS 30. The deallocation vector 40 of the present invention indicates which of the entries of the reservation station are vacant and ready to accept new instruction data and those that are filled and may not accept instruction data on this clock cycle. As discussed above, an entry of the RS becomes deallocated (e.g., vacant) upon dispatch of the instruction to the execution cluster 525. Each one bit entry within the deallocation vector 40 has an associated 200 bit entry of the reservation station. The first entry of the deallocation vector 40 indicates the vacancy for the first entry of the reservation station 30, the second entry of the deallocation vector indicates the vacancy for the second entry of the reservation station and so one respectively for all twenty four entries of the deallocation vector 40 and the reservation station 30.

According to the system of the present invention, a "1" marked in an entry of the deallocation vector indicates that the associated entry in the reservation station is vacant and may accept new instruction data. When an instruction becomes dispatched, its corresponding entry within the deallocation vector 40 is set to "1." When an instruction is allocated to an entry of the RS 30, its corresponding entry within deallocation vector 40 is reset to "0." Therefore, a "0" marked in an entry of the deallocation vector indicates that the associated entry in the reservation station is allocated, and may not accept new instruction data from the instruction decoder. It is appreciated that these bit markings can be switched within the present invention wherein "1" marks a full entry and "0" marks a vacant entry. Such modification would fall within the spirit and scope of the present invention. As data is placed into these entries of the reservation station, the representative entries of the deallocation vector are marked to a "0." Similarly, as the data of these entries of the reservation stations are used and scheduled to the execution units, the corresponding entries of the deallocation vector are marked with a "1" to indicate the vacancy.

Within the instruction scheduler 20 of FIG. 1C, there is also a allocation circuit 35 of the present invention; it is appreciated that this circuitry 35 may be located within allocator 550 but is illustrated within the instruction scheduler 20 for convenience. The allocation circuit 35 of the present invention is responsible for interrogating the bits of the deallocation vector 40 for a given allocation cycle in order to locate entries of the reservation station 30 that are vacant for a set of instructions that are issued from the in-order cluster 10 for this given allocation cycle. This is done because the instruction issue units will supply information associated with four instructions for each clock cycle and these four instructions are to be stored within four vacant entries within the reservation station. The allocation circuitry 35 finds not only four vacant entries, but under the general embodiments, finds four vacant entries that have the highest priority. That is, the allocation circuitry 35 locates the first four vacant entries in the deallocation vector 40 starting from entry zero. Once the four entries are located, the allocation circuit 35 will generate four separate 24-bit enable vectors each having only one bit set. Each bit set corresponds to the location within the reservation station where a vacancy is located. These enable vectors are directly coupled to memory enable devices that will enable four locations within the reservation station 30 buffer to accept the pertinent information relating to the four instructions. Then these reservation station entries will be marked as allocated.

FIG. 1C also indicates that instruction execution units 50a, 50b, and 50c are coupled to the instruction scheduler 20. As stated above, the instruction scheduler 20 schedules instructions supplied by the in-order unit 10 to various instruction execution units. What is appreciated is that the present invention allocation circuit 35 will locate at least four vacancies within the reservation station static RAM 30 in which to place four instructions for scheduling to the execution units 50a, 50b, and 50c. For any given clock cycle, if the microprocessor 101 issues only three (or less) instructions, instead of four instructions, the present invention allocation circuit 35 will advantageously operate to store these three instructions utilizing the same circuitry that locates four vacancies. In this case, one vacancy will not be immediately filled and will remain vacant for the next clock cycle. Similarly, this capability can be extended to cases where the microprocessor issues only two instructions or one instruction at any given clock cycle. In all of these cases the present invention will operate to locate vacancies within the reservation station using the same circuitry developed to locate four vacancies within the reservation station 30.

Deallocation Vector. FIG. 2 illustrates a more detailed diagram of the deallocation vector 40 and the reservation station 30. In a particular embodiment, the deallocation vector is made up of 24 entries numbered zero to twenty-three and is only one bit wide but may vary in entry number as needed; the same is true for the RS 30. Each entry of the deallocation vector 40 is considered a pointer to a corresponding entry with the same number of the reservation station 30. The pointer indicates whether or not the corresponding entry in the reservation station is vacant or allocated. The reservation station 30 is a static RAM memory array having twenty-four entries numbered zero to twenty-three. Each entry is from 100 to 200 bits wide. Each entry may hold the instruction and its associated data for execution by the execution units. Using the deallocation vector and the reservation station, the present invention, under the general embodiments, searches the deallocation vector to locate the entries containing the first four "1s" of the vector.

The major processing tasks performed by the allocation circuit 35 of the general static embodiment of the present invention in order to locate the first four "1s" of the deallocation vector are three fold. First, the allocation circuit 35 generates a set of twelve bitmap vectors by examining the deallocation vector 40. Second, the present invention allocation circuit 35 will multiplex these twelve bitmap vectors to create four separate 24-bit enable vectors, each having at most one bit set within the vector. Third, the present invention will utilize the four separate 24-bit enable vectors to directly enable four memory locations within the reservation station 30 for storage of the instruction data. Lastly, the present invention will update the status of the deallocation vector 40 to reflect that these four memory locations are no longer vacant but hold valid instruction data. A general dynamic embodiment is also disclosed. Further, variations and improvements of each general embodiment are also disclosed.

V. STATIC GENERAL EMBODIMENT

The following discussion illustrates the general static implementation of the present invention four entry allocation mechanism. In this general embodiment, the searching processes is divided into three processes and looks for available entries in each group having 8 bits. Since up to four instructions (uops) need to be allocated on each cycle, each vector looks for an available entry in the group of 8. This process first generates 12 bitmaps, out of which four are selected using a priority multiplexer. This embodiment is static in so far as the generation of the 12 bitmaps is done in a static fashion. The muxing is done on the rising clock edge using a dynamic circuit. The 4 bitmaps that directly activate the write enables of the reservation station are then generated.

Generation of the Twelve Bitmap Vectors 300–311

FIG. 3 illustrates the procedure implemented by the general static embodiment of the allocation circuit 35 present invention that performs the first step of generating the twelve bitmap vectors 300–311. Each of the twelve bitmap vectors is eight bits long and all twelve are organized according to sets of three bitmap vectors. There are four sets of three. Each set of three corresponds to a separate issued instruction, therefore there are four separate sets of three. Within a particular set, each vector corresponds to a separate portion (40a, 40b, 40c) of the deallocation vector 40. Each bitmap vector of a set is simultaneously generated, and the sets are sequentially generated, that is, the deallocation circuit 35 first simultaneously generates bitmap vectors 300, 304 and 308. Next, 301, 305 and 309 are simultaneously generated and then bitmap vectors 302, 306 and 310 are simultaneously generated by the allocation circuit 35 of the present invention. Lastly, bitmap vectors 303, 307 and 311 are simultaneously generated by the allocation circuit 35. Note that bitmap vectors 300, 304 and 308 make up 24-bit vector 42, vectors 301, 305 and 309 make up 24-bit vector 44. Vectors 302, 306 and 310 constitute 24-bit vector 46 and lastly vectors 303, 307, and 311 comprise 24-bit vector 48. According to the method of the circuitry of the present invention, vector 42 is generated first, followed by vector 44, 46 and then vector 48. Initially all the bits of the vectors 300–311 are reset to zero.

Note that the deallocation vector 40 is separated into three 8-bit sections numbered 40a, 40b and 40c. Bitmap vectors 300, 301, 302, and 303 will search vector section 40a in respective priority in order to locate and take a 1 of vector section 40a. Vector 300 takes the first 1 (if there is one at all), vector 301 the second (if a second exists), 302 the third (if a third exists) and 303 the fourth 1 (if a fourth exists). Similarly, vectors 304, 305, 306, and 307 search vector section 40*b* with bitmap vector 304 taking the first 1 of section 40*b*, 305 the second, 306 the third, and 307 the fourth 1. Bitmap vectors 308, 309, 310, and 311 search vector section 40*c* with bitmap vector 308 taking the first 1 of section 40*c*, 309 the second, 310 the third, and 311 the fourth 1. The present invention operates such that each bitmap vector that searches a particular vector section (40*a*, 40*b*, or 40*c*) processes on a priority scheme with the previous bitmap vector having higher priority to take an available one. Note that each bitmap vector may take only a single available 1 from any section of the deallocation vector 40.

More specifically, the circuitry of the general static embodiment of the present invention is implemented such that 8-bit vector 300 of FIG. 3 will contain a 1 in an entry (0 to 7) corresponding to the first 1 found in the entries (0 to 7) of section 40*a* of deallocation vector 40. If no 1 is found in section 40*a* then all of the bits of vector 300 will be zero. Similarly, vector 304 will contain a 1 in an entry (8 to 15) representing the first entry having a 1 in section 40*b* of the deallocation vector. If no 1 is found in section 40*b* then all of the bits of vector 304 will be zero. Lastly, bitmap vector 308 will be given a one in an entry (16 to 23) representing the first occurrence of a 1 within the entries of section 40*c* of the deallocation vector. If no 1 is found in section 40*c* then all of the bits of vector 308 will remain zero. The processing of the circuitry within the allocation circuit 35 that generates vectors 300, 304 and 308 occurs in parallel. The logic gates utilized to implement these functions may be any that conform to the above specified procedures and conditions as long as the bitmap vector 301–311 are generated as specified above.

The general static embodiment of the present invention first determines bitmap vectors 300, 304 and 308 of FIG. 3. An example is given of the logic conditions and logic gates that can be used to implement the procedure utilized by the present invention to determine the bit set in each vector 300, 304 and 308. First entry 0 of vector 300 will be a 1 if entry 0 of vector 40 is a 1. Second, entry 1 of vector 300 will be a 1 if entry 1 of vector 40 is a 1 and entry 0 of vector 40 is a 0 because if entry 0 of vector 40 was a 1 then vector 300 already will have an entry set to one and each vector 300–311 can only take a single 1. Since vector 300 is satisfied, entry 1 will remain zero. Third, entry 2 of vector 300 will be a 1 if entry 2 of vector 40 is a 1 and entries 0–1 of vector 40 are zero. Fourth, entry 3 of vector 300 will be a 1 if entry 3 of vector 40 is a 1 and entries 0–2 of vector 40 are zero. Fifth, entry 4 of vector 300 will be a 1 if entry 4 of vector 40 is a 1 and entries 0–3 of vector 40 are zero. Sixth, entry 5 of vector 300 will be a 1 if entry 5 of vector 40 is a 1 and entries 0–4 of vector 40 are zero. Seventh, entry 6 of vector 300 will be a 1 if entry 6 of vector 40 is a 1 and entries 0–5 of vector 40 are zero. Eighth, entry 7 of vector 300 will be a 1 if entry 7 of vector 40 is a 1 and entries 0–6 of vector 40 are zero. Each of the above eight conditions occurs simultaneously and is implemented by standard logic circuits within the present invention. It should be noted that the above a conditions equally apply to bitmap vectors 304 and 308 where bitmap vector 304 is generated based on vector section 40*b* while bitmap vector 308 is generated based on vector section 40*c*.

Utilizing the above eight conditions for each bitmap vector (300, 304, and 308) and employing AND gates, OR gates, other logic gates, and latches to create an 8-bit register for vectors 300, 304, and 308, circuitry of the present invention allocation circuit 35 can be generated. It is appreciated that any number of different, specific, implementations of logic can be supplied to accomplish the above tasks of he present invention. What is important is the overall procedure executed by the present invention to arrive at the values of vector 300 and the other bitmap vectors 301–311. Similarly, employing the conditions as expressed above, entries of the bitmap vector 304 are respectively generated based on the entries of section 40*b* and the entries of bitmap vector 308 are respectively generated by the present invention based on entries of section 40*c* of the deallocation vector 40. It is appreciated that specific implementation logic is described in Tables 1–4 that provide the logical conditions for bitmap vectors 300–303 and extend to bitmap vectors 304– 311.

The entries of vectors 301, 305 and 309 are next computed by the allocation circuitry 35 of the present invention. Since each bitmap vector takes 1s of its associated section (40*a*, 40*b*, or 40*c*) in a priority scheme, the value given to bitmap vector 301 will be determined based on the value of bitmap vector 300 and the values of vector 40*a*. Bit map vector 302 will be a function of vector section 40*a*, vector 301 and vector 300. Bit map vector 303 will be a function of vector 302, 301 and 300 and section 40*a*. That is, bitmap vector 301 cannot take the first 1 present in section 40*a*, this one belongs to vector 300. Vector 301 can only take the second 1 found in section 40*a*. Likewise, vector 302 takes only the third 1 found in section 40*a* while section 303 can only take the fourth 1 found in section 40*a*.

A typical implementation of the logic required to construct the entries for vectors 301–303 is given. Entry 0 of vector 301 can never be 1 because this would mean that entry 0 of vector 40 was a 1 and therefore entry 0 of the higher priority vector 300 would have already taken this 1. Entry 1 of vector 301 may be 1 if entry 1 of vector 40 is the second 1 of vector 40*a*, that is, entry 0 of vector 40 was also a 1. Entry 2 of vector 301 may be a 1 if entry 2 of vector 40*a* is the second 1 of vector 40*a*. Likewise, entry n (3 to 7) of vector 301 may be a 1 if entry n (3 to 7) of vector 40*a* is the second 1 of vector 40*a*. Similarly, with regard to vector 302, entries 0 and 1 can never be a 1 because vectors 300 and 301 would have taken the 1 before. For the remainder of the entries (2 to 7), an entry n, will only be a one if it is the third one of section 40*a*. With regard to vector 303, entries 0–2 can never be a 1 because vectors 300, 301 or 302 would have taken the 1 before. For the remainder of the entries (3 to 7), an entry n of vector 303, will only be a one if it is the third one of section 40*a*. Thus, vector 300 is a function of vector 40*a*, that is, vector 300=f(40*a*); vector 301=f(300, 40*a*); vector 302=f(301, 300, 40*a*); and vector 303=f(302, 301, 300, 40*a*).

The remainder of the vectors 304 to 307 of FIG. 3 are computed by the present invention similarly to vectors 300 to 303 but vector section 40*b* is analyzed instead of vector section 40*a*. And vectors 308 to 311 are computed by the present invention similarly to vectors 300 to 303 but vector section 40*c* is analyzed instead of vector section 40*a*. That is vector 304 takes the first 1 of section 40*b*, if any, vector 305 the second one of section 40*b*, if any, vector 306 the third one, if any, and lastly vector 307 takes the fourth one, if any. Vector 308 takes the first 1 of section 40*c*, if any, vector 309 the second one of section 40*c*, if any, vector 310 the third one, if any, and lastly vector 311 takes the fourth one, if any.

A specific implementation of the logical conditions of the general static embodiment of the present invention allocation circuitry 35 is disclosed. The conditions are implemented using AND and OR logic gates (NAND and NOR) and other transistor logic in hardware form or could be implemented via PAL or PROM logic. It is appreciated that the present invention is not limited to such specific implementation as there are numerous implementations available to provide the above procedures to arrive at the bitmap vectors 300–311. The logical conditions utilized by the present invention in order to realize the circuitry of the allocation circuit 35 for bitmap vectors 300, 301, 302 and 303 are presented below in the following Tables 1–4 respectively. These tables illustrate the logical conditions utilized by the present invention to arrive at each entry of bitmap vectors 300–303 given the values of the entries of vector segment 40a as an input (i.e., a0 to a7). It is appreciated that these logical conditions disclosed can easily be extended to apply to the generation of the other bitmap vectors 304–311 by referencing the entries of vector sections 40b (for vectors 304–307) and the entries of vector segment 40c (for vectors 308 to 311) instead of section 40a. In the following tables the terminology a0 to a7 refers to the entries 0 to 7 of the allocation vector 40. To determine the values of vectors 304 to 307 utilize entries 8 to 15 of the deallocation vector 40 and similarly to compute the values for vectors 308 to 311 utilize entries 16 to 23 of the deallocation vector 40.

Where:

Rg00=Vector 300 allocated at least one entry of 0–3 entries

Rg10=Vector 300 allocated at least one entry of 4–7 entries

Rg01=Vector 301 allocated at least one entry of 0–3 entries

Rg11=Vector 301 allocated at least one entry of 4–7 entries

Rg02=Vector 302 allocated at least one entry of 0–3 entries

Rg12=Vector 302 allocated at least one entry of 4–7 entries

Rg03=Vector 303 allocated at least one entry of 0–3 entries

Rg13=Vector 303 allocated at least one entry of 4–7 entries

TABLE 1

Logical Conditions for Bitmap Vector 300:

Entry 0 = $a_0$
Entry 1 = $(\bar{a}_0 \cdot a_1)$
Entry 2 = $(\bar{a}_0 \cdot \bar{a}_1 \cdot a_2)$
Entry 3 = $(\bar{a}_0 \cdot \bar{a}_1 \cdot \bar{a}_2 \cdot a_3)$
Entry 4 = $\overline{Rg00} \cdot a_4$
Entry 5 = $\overline{Rg00} \cdot (\bar{a}_4 \cdot a_5)$
Entry 6 = $\overline{Rg00} \cdot (\bar{a}_4 \cdot \bar{a}_5 \cdot a_6)$
Entry 7 = $\overline{Rg00} \cdot (\bar{a}_4 \cdot \bar{a}_5 \cdot \bar{a}_6 \cdot a_7)$

TABLE 2

Logical Conditions for Bitmap Vector 301:

Entry 0 = 0
Entry 1 = $a_0 \cdot a_1$
Entry 2 = $(\bar{a}_0 \cdot a_1 + a_0 \cdot \bar{a}_1) \cdot a_2$
Entry 3 = $(a_0 \cdot \bar{a}_1 \cdot \underline{\bar{a}_2} + \bar{a}_0 \cdot a_1 \cdot \bar{a}_2 + \bar{a}_0 \cdot \bar{a}_1 \cdot a_2) \cdot a_3$
Entry 4 = $\underline{Rg00} \cdot \overline{Rg01} \cdot a_4$
Entry 5 = $\underline{Rg00} \cdot a_4 \cdot a_5 + \overline{Rg00} \cdot \bar{a}_4 \cdot \underline{a_5}$
Entry 6 = $Rg01 \cdot [\underline{\bar{a}_4 \cdot a_5} + a_4 \cdot \bar{a}_5] \cdot a_6 \cdot \overline{Rg00} + \underline{\overline{Rg00}} \cdot \overline{Rg01} \cdot \bar{a}_4 \cdot \bar{a}_5 \cdot a_6$
Entry 7 = $\overline{Rg01} \cdot [\bar{a}_4 \cdot \bar{a}_5 \cdot a_6 + a_4 \cdot \bar{a}_5 \cdot \bar{a}_6 + \bar{a}_4 \cdot a_5 \cdot \bar{a}_6] \cdot a_7$

TABLE 3

Logical Conditions for Bitmap Vector 301:

Entry 0 = 0
Entry 1 = 0
Entry 2 = $a_0 \cdot a_1 \cdot a_2$
Entry 3 = $(a_0 \cdot a_1 \cdot \bar{a}_2 + a_0 \cdot \bar{a}_1 \cdot a_2 + \bar{a}_0 \cdot a_1 \cdot a_2) \cdot a_3$
Entry 4 = $\underline{Rg00} \cdot Rg01 \cdot \overline{Rg02} \cdot a_4$
Entry 5 = $(Rg02 \cdot \underline{Rg00} \cdot Rg11) \cdot \bar{a}_4 \cdot a_5$
Entry 6 = $[\underline{Rg00} \cdot \overline{Rg01}[a_4 \cdot \bar{a}_5 + \bar{a}_4 \cdot a_5] + Rg00 \cdot Rg01 \cdot \underline{a_4 + a_5} + Rg00 \cdot Rg01 \cdot \underline{Rg02} \cdot \bar{a}_4 \cdot \bar{a}_5] \cdot a_6$
Entry 7 = $[Rg00 \cdot Rg01 \cdot Rg02 \cdot \bar{a}_4 \cdot \bar{a}_5 \cdot \bar{a}_0 + Rg00 \cdot \overline{Rg01} \cdot \underline{[a_4} \cdot \bar{a}_5 \cdot \bar{a}_6 + \bar{a}_4 \cdot \bar{a}_5 \cdot a_6 + \bar{a}_4 \cdot a_5 \cdot a_6] + \overline{Rg00} \cdot [a_4 \cdot a_5 \cdot \bar{a}_6 + \bar{a}_4 \cdot a_5 \cdot a_6]] \cdot a_7$

TABLE 4

Logical conditions for bitmap vector 303:

Entry = 0
Entry 1 = 0
Entry 2 = 0
Entry 3 = $a_0 \cdot a_1 \cdot a_2 \cdot a_3$
Entry 4 = $Rg00 \cdot Rg01 \cdot Rg02 \cdot \overline{Rg03} \cdot a_4$
Entry 5 = $Rg00 \cdot Rg01 \cdot Rg02 \cdot \underline{Rg03} \cdot \bar{a}_4 \cdot a_5$
Entry 6 = $[Rg00 \cdot Rg01 \cdot \underline{Rg02} \cdot Rg03 \cdot \bar{a}_4 \cdot \bar{a}_5 + Rg00 \cdot \underline{Rg01} \cdot Rg02 \cdot [\bar{a}_4 \cdot a_5 + a_4 \cdot \bar{a}_5] + Rg00 \cdot Rg01 \cdot a_4 \cdot a_5] \cdot \underline{a_6}$
Entry 7 = $[Rg00 \cdot \underline{Rg01} \cdot Rg02 \cdot Rg03 \cdot \bar{a}_4 \cdot \bar{a}_5 \cdot \bar{a}_6 + Rg00 \cdot Rg01 \cdot Rg\ 2\ [\underline{a_4} \cdot \bar{a}_5 \cdot \bar{a}_6 + \bar{a}_4 \cdot \bar{a}_5 \cdot a_6 + \bar{a}_4 \cdot a_5 \cdot \bar{a}_6] + Rg00 \cdot \overline{Rg01} [a_4 \cdot a_5 \cdot \bar{a}_6 + \bar{a}_4 \cdot a_5 \cdot a_6 + a_4 \cdot \bar{a}_5 \cdot a_6] + \overline{Rg00} [a_4 \cdot a_5 \cdot a_6]] \cdot a_7$ A few examples are presented. Assume that the deallocation vector contains four 1s and they are set at entries: 4, 5, 15, and 20 of the vector. Therefore, section 40a contains two 1s, section 40b contains one of the 1s, and section 40c contains the other. The allocation circuitry 35 will process the deallocation vector 40 according to the logical conditions above and bitmap vector 300 will have a one 1 set in entry 4 by taking the first 1. Bitmap vector 301 will take the second 1 of 40a and entry 5 will be set in this vector. Vectors 302 and 303 will remain zero. Bitmap 304 will have entry 15 set as it takes the only 1 of 40b. Bitmap 308 takes the only one of 40c and entry 23 is set. Vectors 305 to 307 and 309 to 311 will remain set at zero. According to the timing scheme of the present invention, vectors 300, 304 and 308 are computed first, then vectors 301, 305 and 309, then 302, 306 and 310 and lastly 303, 307 and 311. Assume next that the allocation vector 40 had four 1s set in entries: 9, 10, 11, and 12 so that all the 1s were in section 40b. In this case vectors 300 to 303 would remain zero. Vectors 304, 305, 306 and 307 would each have a single bit set in each vector at the entries 9, 10, 11 and 12 respectively. Vectors 308 to 311 would remain zero as no 1s would be in section 40c.

Multiplexing the Bitmap Vectors to Generate the Enable Vectors

FIG. 4 illustrates the next processing step of the general static embodiment of the present invention allocation circuit 35. FIG. 4 illustrates the 12 bitmap vectors 300–311 entering a multiplexing circuit 75 which produces four enable vectors 82, 84, 86, and 88 as an output. The multiplexing circuit 75 is part of the allocation circuit 35 of the present invention. After the twelve bitmap vectors 300–311 are generated, the present invention signals the multiplexing circuit 75 to generate four 24-bit enable vectors 82, 84, 86 and 88 each having only one bit set. These enable vectors will be tied directly to write enable gates of the reservation station 30 entries. The general static embodiment of the present invention will read the status of the twelve vectors 300–311 and pass them through a specialized multiplexer circuit 75 which will generate an output of four 24-bit enable vectors, each enable vector having only 1 bit set. The enable vectors will each take the highest priority of the 1s found within the bitmap vectors. Therefore, if the deallocation vector 40 had 1s set in the following entries: 4,10, 18, and 23 then enable vector 82 would have entry 4 set to 1 and all other entries set to zero, enable vector 84 would have entry 10 set to 1 with others zero, enable vector 86 would have entry 18 set to 1 with others zero and lastly enable vector 88 would have entry 23 set to 1 with others set to zero.

The processing strategy of the multiplexing circuit 75 is to examine the 12 bitmap vectors 300–311 and to take the highest priority of the 1s set according to vectors 42, 44, 46, and 48. Because of the allocation system of the present invention that generated vectors 42, 44, 46, and 48, there may be more than a single 1 within any given vector. The enable vectors 82, 84, 86, and 88 only will contain a single 1, at most, within each vector. Therefore, each of the enable vectors will be generated by first searching bitmap vectors 42, 44, 46, and 48 and taking the highest priority 1 found in the first entry number. If multiple 1s are found in a particular bitmap vector, then the second 1 can be used to generate the next enable vector. Therefore, if two 1s exist within bitmap vector 42 then the first 1 can be used to form enable vector 82 while the second 1 can be used to form enable vector 84 depending on the priority of the that 1 or other 1s within bitmap vector 44. It should be noted that the present invention locates the first four 1s within the deallocation vector 40, so allocation priority is very important to the processing of the present invention.

According to the processing logic of the general static embodiment of the present invention, enable vector 82 will select from bitmap vector 42. Enable vector 84 will select from bitmap vector 44 and any carryovers from bitmap vector 42. Enable vector 86 will select from bitmap vector 46 and any carryovers from bitmaps 42 and 44. Lastly, enable vector 88 will select from bitmap vector 48 and any carryovers from bitmap vectors 42, 44 or 46.

Therefore, the multiplexing circuit 75 of the FIG. 4 performs two basic functions. First, for any given bitmap vector 42, 44, 46, or 48, the present invention selects bitmap vector 300–311 containing the highest priority 1 (measured by the entry with the lowest number) and equates that bitmap vector with an associated enable vector 82, 84, 86, and 88. Second, if there are remainder 1s set in a particular bitmap vector 42, 44, 46, or 48, then they are made available for the next bitmap vector in priority. For example, assume that bitmaps 300 (entry 3), 304 (entry 10) and 309 (entry 22) are set with a 1 while vectors 301, 305, and 308 are zero. The multiplexing circuits would place the 1 of bitmap 300 into enable vector 82 at entry 3 and enable vector 82 would be complete. Next, the circuits 75 would make the 1 of bitmap vector 304 available for the selection of enable vector 84. Enable vector 84 can therefore select either bitmap 304 (entry 10) or bitmap 309 (entry 22). Because the entry at 10 is of higher priority than entry 22, the present invention constructs enable vector 84 with bitmap 304 (entry 10) and carry forward bitmap 309 to the processing for enable vectors 86 and 88 depending on the state of the other bitmap vectors 302–303, 306–307 and 310–311. In so doing the present invention constructs the enable vectors 82, 84, 86, and 88 by prioritizing the enable bits.

For instance, generation of enable vector 82 of FIG. 4 is the most straight forward. Enable vector 82 will take the 1 of the entry of bitmap vector 300 if there is a one in that bitmap vector. Enable vector 82 will take the 1 of the entry of bitmap vector 304 if there is a bit in that bitmap and if bitmap vector 300 is zero. Enable vector 82 will take the 1 of the entry of bitmap vector 308 if there is a one in that bitmap vector and if bitmap vector 300 is zero and if bitmap vector 304 is zero. Table 5 illustrates the specific logical conditions executed by the present invention allocation circuit 35 to perform the multiplexing operations done in multiplexing circuit 75. It is appreciated that the present invention implements these logical conditions with logic gates, registers, and other hardware components. It is further appreciated that a number of specific logic implementations of the below equations can be accomplished and these would come within the scope of the present invention.

According to the terminology of Table 5, the following terms are utilized:

$V_0$=a bit is set in bitmap vector 300

$V_1$=a bit is set in bitmap vector 301

$V_2$=a bit is set in bitmap vector 302

$V_3$=a bit is set in bitmap vector 303

$V_4$=a bit is set in bitmap vector 304

$V_5$=a bit is set in bitmap vector 305

$V_6$=a bit is set in bitmap vector 306

$V_7$=a bit is set in bitmap vector 307

$V_8$=a bit is set in bitmap vector 308

$V_9$=a bit is set in bitmap vector 309

$V_{10}$=a bit is set in bitmap vector 310

$V_{11}$=a bit is set in bitmap vector 311 and $BMV_n$=the bitmap of vector n

TABLE 5

Generation of the Enable Vectors:

Enable Vector 82 =
$$BMV_{300} \cdot V_0 + BMV_{304} \cdot V_4 \cdot \bar{V}_0 +$$
$$BMV_{308} \cdot V_8 \cdot \bar{V}_4 \cdot \bar{V}_0$$

Enable Vector 84 =
$$BMV_{301} \cdot V_1 + [BMV_{304} \cdot V_0 \cdot V_4 + BMV_{305} \cdot V_5 \cdot \bar{V}_0 +$$
$$BMV_{308} \cdot (V_0 \cdot \bar{V}_4 + \bar{V}_0 \cdot V_4) \cdot \bar{V}_5 \cdot V_8 +$$
$$BMV_{309} \cdot V_9 \cdot \bar{V}_0 \cdot \bar{V}_4] \cdot \bar{V}_1$$

Enable Vector 86 =
$$BMV_{302} \cdot V_2 + BMV_{304} \cdot V_4 \cdot V_1 \cdot \bar{V}_2 +$$
$$BMV_{305} \cdot V_5 \cdot V_0 \cdot \bar{V}_1 + BMV_{306} \cdot V_6 \cdot \bar{V}_0 +$$
$$BMV_{308} \cdot V_8 \cdot (V_0 \cdot \bar{V}_1 \cdot V_4 \cdot \bar{V}_5 + V_1 \cdot \bar{V}_2 \cdot \bar{V}_4) +$$
$$BMV_{309} \cdot V_9 \cdot (V_0 \cdot \bar{V}_1 \cdot \bar{V}_4 + \bar{V}_0 \cdot V_4 \cdot \bar{V}_5) +$$
$$BMV_{310} \cdot V_{10} \cdot \bar{V}_0 \cdot \bar{V}_4$$

Enable Vector 88 =
$$BMV_{303} \cdot V_3 + BMV_{304} \cdot V_2 \cdot \bar{V}_3 \cdot V_4 +$$
$$BMV_{305} \cdot V_1 \cdot \bar{V}_2 \cdot V_5 +$$
$$BMV_{306} \cdot V_0 \cdot \bar{V}_1 \cdot V_6 + BMV_{307} \cdot \bar{V}_0 \cdot V_7 +$$
$$BMV_{308} \cdot V_8 \cdot (V_2 \cdot \bar{V}_3 \cdot \bar{V}_4 + V_1 \cdot \bar{V}_2 \cdot V_4 \cdot \bar{V}_5 +$$
$$V_0 \cdot \bar{V}_1 \cdot V_5 \cdot \bar{V}_6 + \bar{V}_0 \cdot V_6 \cdot \bar{V}_7) +$$
$$BMV_{309} \cdot V_9 \cdot (V_1 \cdot \bar{V}_2 \cdot \bar{V}_4 + V_0 \cdot \bar{V}_1 \cdot V_4 \cdot \bar{V}_5 +$$
$$\bar{V}_0 \cdot V_5 \cdot \bar{V}_6) +$$
$$BMV_{310} \cdot V_{10} \cdot (V_0 \cdot \bar{V}_1 \cdot \bar{V}_4 + \bar{V}_0 \cdot V_4 \cdot \bar{V}_5) +$$
$$BMV_{311} \cdot V_{11} \cdot \bar{V}_0 \cdot \bar{V}_4$$

As the logic conditions of Table 5 illustrate, each of the entry vectors 82, 84, 86 and 88 can be generated by the present invention multiplexing circuits 75 in parallel. That is, the enable vectors are not functions of each other, but rather, they are functions of the bitmap vectors 300–311. Therefore, the logic required to construct the enable vectors that operates within the multiplexing circuits 75 performs simultaneously to generate the four enable vectors once the bitmap vectors 300–311 have been generated by other hardware of the allocation circuitry 35. Once the enable vectors are generated, they are utilized the further circuitry of the present invention in order to allow the four instructions and associated information to be placed in the four indicated vacant entries of the reservation station 30.

Enabling of the Reservation Station 30.

Refer to FIG. 5 which illustrates the circuitry of the present invention that enables the reservation station 30 to accept the instructions and associated information that are issued by the microprocessor 101 and sent from the instruction decoder 10. The circuitry of FIG. 5 may be employed with each of the embodiments of the present invention as described herein. The circuits of FIG. 5 enable any one of the instructions presented at lines 91–94 to be routed to any of the 24 entries of the reservation station 30 depending on those indicated as vacant by the deallocation vector 40. Each of the 24 bit enable vectors 82, 84, 86, and 88 are coupled to the reservation station 30 via four sets of 24 enable pass gates. For any given instruction, there are 24 different pass gates which will couple that instruction to one of the entries of the reservation station 30. Each instruction 1–4 has a separate enable vector 82, 84, 86, or 88 which will act to couple the instruction to the reservation station. Enable vector 82 couples instruction 1, enable vector 84 couples instruction 2, enable vector 86 coupled instruction 3 and enable vector 88 couples instruction 4. It is appreciated that the enable circuitry of FIG. 5 may be located within the reservation station in the preferred embodiment of the present invention. In other embodiments of the present invention, the enable circuitry of FIG. 5, except for reservation station 30 and the instruction decoder 10, are located within the allocation circuit 35.

The total circuitry of the present invention required to perform the enable function of the reservation station 30 is complex because there are 24 separate, but similar stages. In the interests of clarity, the circuitry of the present invention associated with the first entry of each of the vectors and the $i^{th}$ entry of each of the vectors is illustrated in FIG. 5. Each of the other 24 entries will be the same as those illustrated, therefore, the circuitry for each entry is not illustrated in detail as to not obscure the present invention. FIG. 5 illustrates that the instruction decoder 10 presents instructions and instruction information on the four lines 91 to 94. Instruction 1 is placed over line 91 and enabled by vector 82, instruction 2 over line 92 and enabled by vector 84, instruction 3 over line 93 and enabled by vector 86 and lastly instruction 4 over line 94 and enabled by vector 88.

Entry 0 for each of the enable vectors 82, 84, 86, and 88 are coupled to the enable pins of a set of four pass gates. The bit of entry 0 of enable vector 82 is coupled to the enable pin of pass gate 201(0) via line 210. The bit of entry 0 of enable vector 84 is coupled to the enable pin of pass gate 202(0) via line 211. The bit of entry 0 of enable vector 86 is coupled to the enable pin of pass gate 203(0) via line 212. The bit of entry 0 of enable vector 88 is coupled to the enable pin of pass gate 204(0) via line 213. The data flow pin 91 associated with instruction 1 is communicatively coupled to the instruction decoder 10 (actually, the instruction decoder sends instructions to a Register Alias Table "RAT" first which then forwards the instructions to the reservation station, however the operation of the RAT is not pertinent to the understanding of the present invention) and to the input of pass gate 201(0). Line 92 carries instruction 2 and is coupled to the instruction decoder 10 and to the input of pass gate 202(0). The data flow pin 93 associated with instruction 3 is coupled to the instruction decoder 10 and to the input of pass gate 203(0). Line 94 carries instruction 4 and is coupled to the instruction decoder 10 and to the input of pass gate 204(0). The outputs of each of the pass gates 201(0), 202(0), 203(0), and 204(0) are coupled to entry 0 of the reservation station 30 via the single line 220(0). When an entry within the enable vectors is active, that is, carries a 1, it will active the associated pass gate to couple the input and the output lines together and allow instruction information to flow into the reservation station 30. When disabled, i.e., a 0 is present in a particular entry, the pass gate will not couple the instruction data to the reservation station. It is appreciated that within the present invention the pass gates may be implemented utilizing multiported memory cell arrays.

Only one of the pass gates of these first set of four can be activated at any one time because only one entry 0 of the enable vectors 82, 84, 86, and 88 will be active at any time. Depending on the active pass gate of these four, if any, an instruction (1–4) and its associated data will be routed from the instruction decoder 10 into the 100–200 bit entry of the reservation station 30. It is appreciated that for each of the 24 entries of the enable vectors, the above circuitry and set of four enable pass gates (201(i)–204(i))is present to allow all 24 entries of the reservation station 30 to accept instruction information. Entry 0 of vector 82 mutes instruction 1, entry 0 of vector 84 routes instruction 2, entry 0 of vector 86 routes instruction 3 and entry 0 of vector 88 routes instruction 4.

For clarity, the coupling required for the $i^{th}$ entry of the enable vectors and reservation station is illustrated in FIG. 5. It is appreciated that the circuitry for this $i^{th}$ entry is duplicated for all 24 entries of the present invention. Each $i^{th}$ entry of vector 82 is coupled by a line 216 to an enable pin of a pass gate 201(i) which receives an input from the instruction decoder 10 for instruction 1 (over line 91) and has an output coupled to a line 220(i) which couples instruction 1 into the $i^{th}$ entry of the reservation station 30. Each entry of enable vector 84 is coupled. Each $i^{th}$ entry of vector 84 is coupled by a line 217 to an enable pin of a pass gate 202(i) which receives an input from the instruction decoder 10 for instruction 2 (over line 92) and has an output coupled to a line 220(i) which couples instruction 2 into the $i^{th}$ entry of the reservation station 30. Each $i^{th}$ entry of vector 86 is coupled by a line 218 to an enable pin of a pass gate 203(i) which receives an input from the instruction decoder 10 for instruction 3 (over line 93) and has an output coupled to a line 220(i) which couples instruction 3 into the $i^{th}$ entry of the reservation station 30. Lastly, each $i^{th}$ entry of vector 88 is coupled by a line 219 to an enable pin of a pass gate 204(i) which receives an input from the instruction decoder 10 for instruction 4 (over line 94) and has an output coupled to a line 220(i) which couples instruction 4 into the $i^{th}$ entry of the reservation station 30.

It is appreciated that since each of the enable vectors 82, 84, 86 and 88 is created simultaneously, they are simultaneously applied to the pass gate network (containing pass gates 201(i), 202(i), 203(i), and 204(i)). Therefore, the four instructions 1–4 are simultaneously applied from the instruction decoder 10 to the four vacant entries of the reservation station 30 as indicated by the four enable vectors.

An example configuration of the enable vectors is given. Assuming that the highest priority enable vector 82 entry 2 had a one, enable vector 84 entry 6 had a one, enable vector 86 entry 10 had a one and the lowest priority enable vector 88 entry 20 had a one. Entry 2 of vector 82 would enable instruction 1 to be fed into entry 2 of the reservation station via a pass gate 201(2) and line 220(2). Entry 6 of enable vector 84 would feed instruction 2 into entry 6 of the reservation station 30 via a pass gate 202(6). Entry 10 of enable vector 86 will feed instruction 3 into entry 10 of the reservation station 30 via a pass gate 203(10). And lastly, entry 20 of enable vector 88 will feed instruction 4 from the instruction decoder 10 into entry 20 of the reservation station 30 via a pass gate 204(20). The above will happen simultaneously as each of the enable vectors are created at the same time and will be applied to the pass gate network at the same instant in time.

Updating the Deallocation Vector

Once write enable vectors 82, 84, 86, and 88 have been determined by the present invention, the deallocation vector 40 is updated to remove the 1s from the four entries marked by the enable vectors. Each enable vector 82, 84, 86, 88 is analyzed in the present invention in order to determine which entry is set to 1. The corresponding entry in the deallocation vector 40 is then toggled to change from a 1 to a zero. This can rapidly be done by coupling each entry of all four enable vectors to the entries of the deallocation vector 40. Those entries in the enable vectors having a 1 will act to toggle the corresponding entries within the deallocation vector 40.

During the same clock cycle period as the present invention allocation circuit 35 is operating, previously stored instructions within the reservation station 30 are dispatched for execution and thus complete their occupancy of the reservation station and are fed to the execution units 50a–50c. Once a particular instruction is fed to the execution units and removed from the reservation station 30, the entry in which it occupied may become vacant. Therefore, instructions are tracked which have been output from the instruction scheduler 20 and their entries are marked as vacant within the deallocation vector by placing a 1 within the corresponding entry. For any given clock cycle, the general static embodiment of the present invention will be determining which of the highest priority entries within the deallocation vector are vacant, storing instructions into those entries, marking those entry as full, and then marking other previously stored entries as vacant as their associated instructions leave the instruction scheduler.

Processing Flow of the General Static Implementation

In summary, the general static embodiment of the present invention operates to perform the following tasks as illustrated in the flow diagram of FIG. 6. FIG. 6 illustrates the major processing tasks performed by the allocation circuit 35 of the present invention. New instructions are issued by the microprocessor 101 at block 610. Typically there are up to four new instructions issued by the microprocessor via the instruction decoder at block 610. The present invention must find entries within the reservation station 30 for these instructions. The present invention, at block 620, first examines the deallocation vector 40, in the manner described above, to generate twelve 8-bit bitmap vectors based on the number and placement of the 1s located within the deallocation vector. The input to block 620 is the deallocation vector 40 and the output of block 620 are the twelve bitmap vectors 300–311. Block 620 operates within 4 nanoseconds. The 12 twelve bitmap vectors are generated in sequence, set of three is generated simultaneously and four of such sets are generated in rapid sequence. It is appreciated that block 620 of the present invention is accomplished via logical conditions (of Tables 1–4) that are implemented in transistor logic.

Next, at block 630 the dynamic multiplexing of the present invention is done; the present invention examines the twelve bitmap vectors and generates therefrom, using a multiplexing circuit in the manner described above, four 24-bit enable vectors 82, 84, 86, and 88. Each of the enable vectors will have only one bit set of the 24 entries. Block 630 operates within 1.1 nanoseconds. The input of block 630 of the present invention are the twelve 8-bit bitmap vectors and the output of block 630 are the four 24-bit enable vectors. The four enable vectors are generated by the present invention simultaneously according to the multiplexing conditions. It is appreciated that block 630 of the present invention is accomplished via logical conditions (of Table 5) that are implemented in transistor logic.

Referring to FIG. 6, at block 640, the present invention applies the four 24 bit vectors to a pass gate network that routes the four instructions into four vacancies of the reservation station as indicated by the four enable vectors. Each enable vector is responsible for directing a particular instruction to an entry within the reservation station. The input to block 640 are the four enable vectors and the output of this block is the passage of the instructions into the reservation station. At block 650 the deallocation vector is updated by toggling to zero those entries that are used by the enable vectors to hold the new instruction data. At the same time, the reservation station marks as vacant those entries that correspond to instructions that have been sent to the execution units from the instruction scheduler. The processing of the flows from block 610 to block 650 occurs within one clock cycle. At the start of the next clock cycle the present invention returns to block 610 to start the cycle once more for a new set of instructions and an updated deallocation vector.

It is appreciated that the circuits of the general static embodiment are realized using Bi-CMOS technology.

VI. GENERAL DYNAMIC EMBODIMENT

The present invention is also implemented via a substantially dynamic general embodiment. This embodiment is called dynamic in so far as this embodiment utilizes dynamic CMOS circuit design techniques. Within this embodiment, there are four distinct stages of the invention that operate in series fashion. This process of the present invention takes the deallocation vector 40 and generates 4 enable vectors, one for each instruction. Each of these enable vectors is 24 bits wide and can have only one entry set for a "1." The "1" directly activates the write enable of the reservation station entry which allows all information pertaining to that instruction to be written into the reservation station. This portion of the dynamic implementation is identical to the static implementation.

FIG. 7 illustrates the overall process flow of the general dynamic embodiment of the present invention. It is appreciated that FIG. 7 specifically identifies the input and output labels used in the detailed circuit of FIG. 8A and FIG. 8B. A sample deallocation vector 40 is given illustrating four "1s" within the vector. The 24 entries of the deallocation vector 40 are labeled a0 to a23. According to the flow of FIG. 7, the present invention at the first stage, scans the deallocation vector 40 for a first priority "1." Priority is determined based on the entry number of the vector, where 0 is the highest and 23 the lowest, however, any priority scheme could be adopted within the scope of the present invention (i.e., where entry 23 is the highest priority and 0 the lowest, or where 0–11 are taken and then 12–23, etc.). Upon locating the first priority one, the present invention at the first stage outputs enable vector 150 having a 1 set corresponding to the entry number of the highest priority 1 of the deallocation vector 40 and zeros elsewhere for the other 23 entries. This is the "b" output vector. The enable vector 150 corresponds to the 24 outputs b0 to b23 of the circuits of FIG. 8A and FIG. 8B. Also, at the first stage, avail__1 outputs are generated which are found in vector 710 of FIG. 7. Entries of the avail__1 vector are called a1avail1

(note a0avail1 would not be generated because this bit would not be sent to the) to a23avail1.

These outputs indicate the entries of the deallocation vector that are available to the subsequent stages of the present invention searching process; an entry is available (whether or not it is a "1" or a "0") if it has not yet been selected by an enable vector. In other words, the available vectors (710, 720, 730) indicate those entries that were not yet selected by a higher priority enable vector (150, 151, 152, 153). For instance, the avail_1 vector 710 indicates that all the entries of the deallocation vector are available ("1") to the second stage processing except 1) the entry (a3) that corresponds to the highest priority "1" found and 2) the first entry (a0) of the deallocation vector 40 can never be available for the second stage because the first stage would have taken it.

It is appreciated that there is not a signal a0avail1 generated because this bit a0 is never available for the second stage processing for output1 enables. It a0 is set, it would be taken by the first stage. The signal alavail1 indicates that bit 1 was not set in the first stage enable vector. This could mean that bit0 was set (a0=1) or that the a1 bit was a zero.

At the second stage processing the present invention general dynamic embodiment searches for the next highest priority "1" of the deallocation vector and generates enable vector 151 based on this entry. At the second stage, the avail_2 vector 720 is generated that indicates the entries of the original deallocation vector that are available to the third processing stage. Entries 0 and 1 of the avail_2 vector 720 are not available to the third state since the first or the second stage would have taken them. Entries of the avail_2 vector are called a0avail2 to a23avail2. Also, the first two highest priority "1s" found in the first and second stage will not be available to the third processing and they are marked as not available in the 720 vector. The second stage outputs vector 151 as the second enable vectors. Entries c0 to c23 make up the 24 entries of this enable vector and correspond to the outputs of FIG. 8A and FIG. 8B.

At the third stage of processing of the present invention, the third enable vector 152 is generated and holds the third priority "1" located within the deallocation vector 40. Enable vector 152 is composed of 24 entries labeled d0 to d23. An avail_3 vector 730 indicates which entries of the deallocation 40 are available for the fourth and last processing stage of the present invention. Entries of the avail_3 vector are called a0avail3 to a23avail3. The avail_3 vector will indicate that the first three priority "1s" are not available and also that the first three entries are not available to the enable vector 153 (generated by the fourth stage). Lastly, the enable vector 153 is generated by the fourth stage of the present invention wherein the deallocation vector is scanned to locate the fourth priority "1" of the 24 entries. The enable vector 153 is composed of 24 entries e0 to e23. There are no subsequent scanning stages of the general dynamic embodiment of the present invention past the fourth stage so no available vector is generated as a result of the fourth stage.

Therefore according to FIG. 7, the present invention general dynamic embodiment contains four stages that are operated in sequence. The first stage generates the first enable vector 150 and an avail_1 710 vector which is used by the second stage to indicate those entries of the deallocation vector 40 still available. The second stage generates enable vector 151 and also an avail_2 vector 720 to indicate to the third stage which entries of the deallocation vector 40 are yet available for selection. The third stage generates enable vector 152 and a last available vector avail_3 730 which indicates to the last stage which entries of the deallocation vector 40 have not been selected and are therefore available. The last processing stage then generates the last enable vector 153. As the static embodiment, the enable vectors of the dynamic embodiment are coupled as shown in FIG. 5 with regard to the enable vectors 82, 84, 86, and 88 respectively, to control information access into the reservation station 30 for the current four instructions. Enable vector 150 is coupled as vector 82, vector 151 is coupled as vector 84, vector 152 is coupled as vector 86 and vector 153 is coupled as vector 88.

Figure 8A:
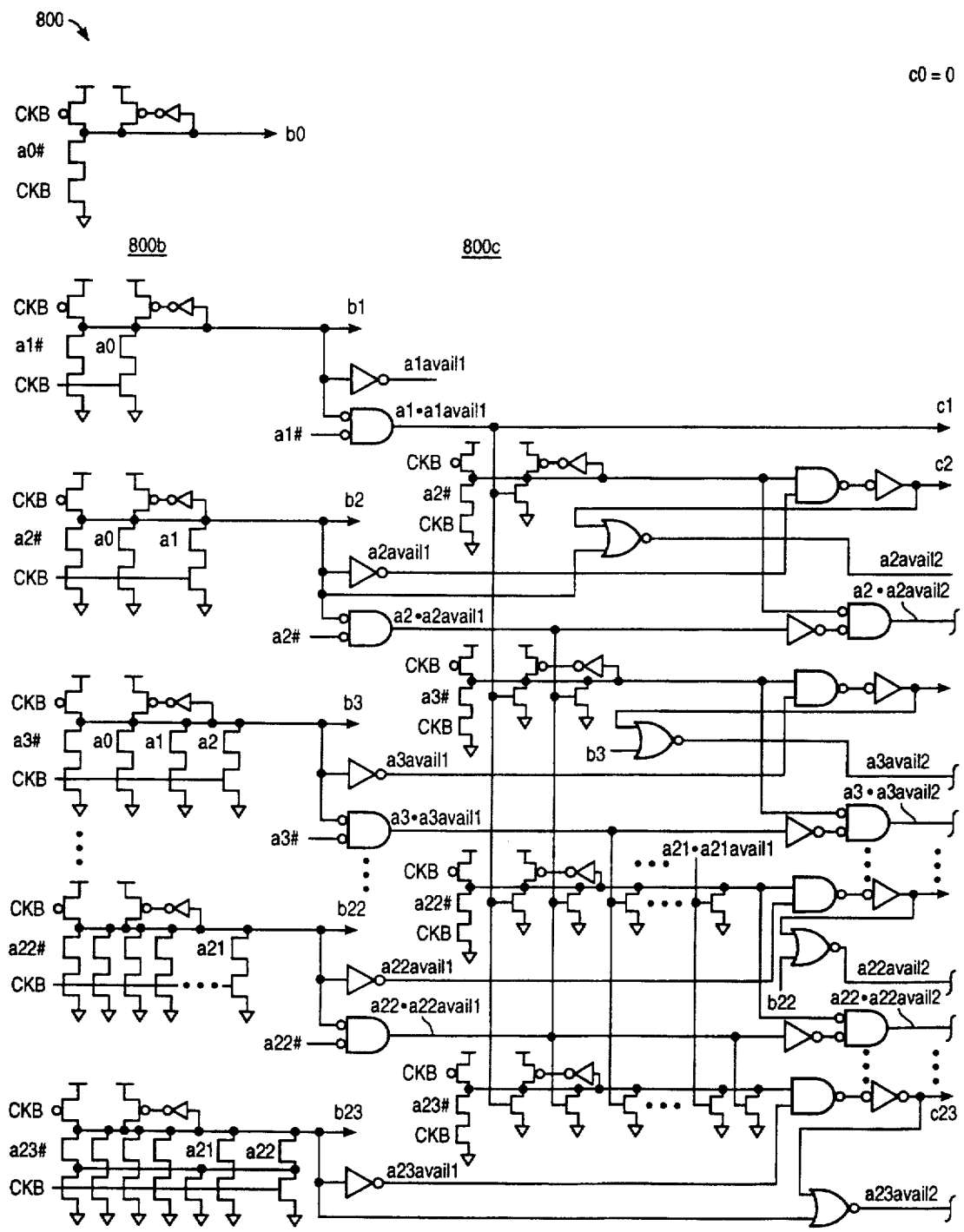
FIG. 8A and FIG. 8B illustrate the circuitry implemented by the present invention to realize the dynamic embodiment of the present invention.
Figure 8B:
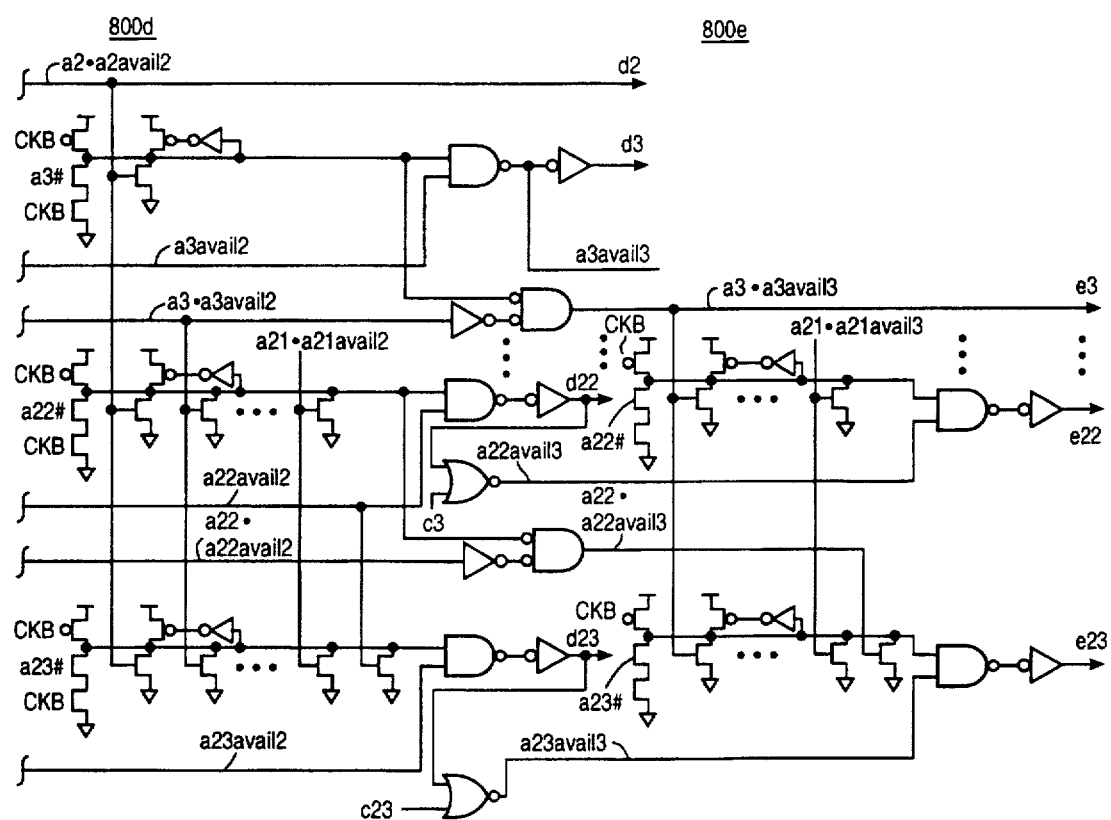

The specific and detailed implementation of the circuitry 800 of the general dynamic embodiment of the present invention is illustrated in FIG. 8A and FIG. 8B. The logic utilized by the dynamic embodiment as shown in Bi-CMOS technology. The entire circuitry of the dynamic embodiment is very complex and functionally redundant in many places. FIGS. 8A and 8B illustrate the major circuit and logic stages of the this embodiment in a form that can be understood and replicated in the areas illustrated in order to generate the repeating circuitry. The reduced circuit logic of FIGS. 8A and 8B is presented for clarity. It is appreciated that given the circuitry plan of FIGS. 8A and 8B and the related discussions, the entire circuit of the dynamic embodiment of the present invention can easily be realized. The first stage of the dynamic implementation is 800b, the second stage is 800c, the third stage is 800d, and the final stage of the dynamic embodiment is 800e. The circuit notation "#" refers to the inverse of the signal indicated and "ckB" indicates the clock pulse used to generate the functions of the dynamic embodiment of the present invention (which is the same as the ck# designation).

Referring to FIG. 8A, stage 800b inputs the 24 entries (and inverses) of the deallocation vector labeled a0 to a23 and the clock pulse. Stage 800b, as shown, outputs the first enable vector 150 as outputs b0 to b23. Stage 800b also outputs the first avail_1 vector 720 as outputs a0avail1-a23avail1. The second stage 800c inputs the avail_1 vector 720 and the clock to output the second enable vector 151 composed of outputs b0 to b23. The second stage 800c outputs the second available vector a2avail2 to a23avail2. These outputs are then coupled to the inputs of the third stage 800d shown in FIG. 8B as well as the clock. The third stage 800d outputs the entries d0 to d23 of the third enable vector 152 as well as the third available vector 730 composed of entries a3avail3-a23avail3 to the last stage. The four and last stage 800e inputs the third available vector 730 and the clock and generates therefrom the last enable vector 153 composed of entries e0 to e23. Due to the coupling of the stages, the dynamic embodiments operates in sequence with the first, second, third and last stage operating respectively to generate the enable vectors 150, 151, 152 and 153 in sequence.

After the four enable vectors 150–153 are generated, the general dynamic embodiment then enables the corresponding entries of the reservation station and updates the deallocation vector 40 to reflect that the selected entries of the enable vectors are allocated. It is appreciated that sections of the general static embodiment of the present invention are analogous to the general dynamic embodiment of the present invention unless specifically differentiated herein.

It is appreciated that the logic utilized within the general dynamic embodiment of the present invention illustrated in FIG. 8A and FIG. 8B is listed below in the Logic Section. According to this listing the values B[0] to B[23] represent the stage0 output vector of FIG. 7. Values C[0] to C[23] represent the stage1 output vector of FIG. 7. Values D[0] to D[23] represent the stage2 output vector of FIG. 7. And, values E[0] to E[23] represent the last stage, or stage3, output vector of FIG. 7. The logic implemented by the Logic Section is one illustration of the present invention and the present invention should not be construed as limited by this particular embodiment as several variations of the particular logic utilized within an embodiment of the present invention would remain within the spirit and scope of the present invention.

LOGIC SECTION
FOR GENERAL DYNAMIC EMBODIMENT

| | | |
|---|---|---|
| B[0] | := | A[0]; |
| B[1] | := | (NOT A[0]) AND A[1]; |
| | | a1avail1 := NOT B[1]; |
| | | a1.alavail1 := A[1] AND a1avail1; |
| B[2] | := | (NOT a[0]) AND (NOT A[1]) AND A[2]; |
| | | a2avail := NOT B[2]; |
| | | a2.a2avail1 := A[2] AND a2avail1; |
| B[3] | := | (NOT A[0]) AND (NOT A[1]) AND (NOT A[2]) AND A[3]; |
| | | a3.avail1 := NOT B[3]; |
| | | a3.a3avail1 := A[3] AND a3avail1; |
| B[4] | := | (NOT A[0]) AND (NOT A[1]) AND (NOT A[2]) AND (NOT A[3]) AND A[4]; |
| | | a4.avail1 := NOT B[4]; |
| | | a4.a4avail1 := A[4] AND a4avail1; |
| B[5] | := | (NOT A[0]) AND (NOT A[1]) AND (NOT A[2]) AND (NOT A[3]) AND (NOT A[4]) AND A[5]; |
| | | a5avail1 := NOT B[5]; |
| | | a5.avail1 := A[5] AND a5avail1; |
| B[6] | := | (NOT A[0]) AND (NOT A[1]) AND (NOT A[2]) AND (NOT A[3]) AND (NOT A[4]) AND (NOT A[5]) AND A[6]; |
| | | a6avail1 := NOT B[6]; |
| | | a6.avail1 := A[6] AND a6avail1; |
| B[7] | := | (NOT A[0]) AND (NOT A[1]) AND (NOT A[2]) AND (NOT A[3]) AND (NOT A[4]) AND (NOT A[5]) AND A[6] AND A[7]; |
| | | a7avail1 := NOT B[7]; |
| | | a7.avail1 := A[7] AND a7avail1; |
| B[8] | := | (NOT A[0]) AND (NOT A[1]) AND (NOT A[2]) AND (NOT A[3]) AND (NOT A[4]) AND (NOT A[5]) AND A[6] AND A[7] AND [A8]; |
| | | a8avail1 := NOT B[8]; |
| | | a8.avail1 := A[8] AND a8avail1; |
| B[9] | := | (NOT A[0]) AND (NOT A[1]) AND (NOT A[2]) AND (NOT A[3]) AND (NOT A[4]) AND (NOT A[5]) AND A[6] AND A[7] AND A[8] AND A[9]; |
| | | a9avail1 := NOT B[9]; |
| | | a9.avail1 := A[9] AND a9avail1; |
| B[10] | := | (NOT A[0]) AND (NOT A[1]) AND (NOT A[2]) AND (NOT A[3]) AND (NOT A[4]) AND (NOT A[5]) AND A[6] AND A[7] AND A[8] AND A[9] AND A[10]; |
| | | a9avail1 := NOT B[9]; |
| | | a9.avail1 := A[9] AND a9avail1; |
| B[10] | := | (NOT A[0]) AND (NOT A[1]) AND (NOT A[2]) AND (NOT A[3]) AND (NOT A[4]) AND (NOT A[5]) AND A[6] AND A[7] AND A[8] AND A[9] AND A[10]; |
| | | a10avail1 := NOT B[10]; |
| | | a10.a10avail1 := A[10] AND a10avail1; |
| B[11] | := | (NOT A[0]) AND (NOT A[1]) AND (NOT A[2]) AND (NOT A[3]) AND (NOT A[4]) AND (NOT A[5]) AND A[6] AND A[7] AND A[8] AND A[9] AND A[10] AND A[11]; |
| | | a11avail1 := NOT B[11]; |
| | | a11.a11avail1 := A[11] AND a10avail1; |
| B[23] | := | NOT A[0]) AND (NOT A[1]) AND (NOT A[2]) AND (NOT A[3]) AND NOT A[4]) AND (NOT A[5]) AND (NOT A[6]) AND (NOT A[7]) AND ... AND (NOT A[22]) AND A[23]; |
| | | a23avail1 := NOT B[23]; |
| C[0] | := | 0; |
| C[1] | := | a1.alvail1; |
| C[2] | := | (NOT a1.alvail1;) AND a2avail1 AND A[2]; |
| | | a2avail2 := 0; |
| | | a2.a2avail2 := (a1.alavail1) OR A[2]) AND a2.a2avail1; |
| C[3] | := | (NOT a1.alavail1) AND (NOT a2.a2avail1) AND a3avail1 AND A[3]; |
| | | a3avail2 := B[3] NOR C[3]; |
| | | a3.a3avail2 := (a1.alavail1 OR NOT A[3]) AND a3.a3avail1; |
| C[4] | := | (NOT A1.a1avail1) AND (NOT a2.a2avail1) AND (NOT a3.a3avail1) AND a4avail1 AND A[4]; |
| | | a4avail2 := B(4) NOR C[4]; |
| | | a4.a4avial2 := (a1.alavail1 OR a2.a2avail OR a3.avail1 OR NOT A[4]) AND a4.a4avail1; |
| C[5] | := | (NOT A1.a1avail1) AND (NOT a2.a2avail1) AND (NOT a3.a3avail1) AND a4avail1 AND A[5] AND a5avail1 AND A[5]; |
| | | a5avail2 := B(5) NOR C[5]; |
| | | a5.a5avial2 := (a1.alavail1 OR a2.a2avail OR a3.avail1 OR NOT A[4]) AND a4.a4avail1 OR NOT A[5] AND a5.a5avail1; |
| C[5] | := | (NOT A1.a1avail1) AND (NOT a2.a2avail1) AND (NOT a3.a3avail1) AND a4avail1 AND A[5] AND a5avail1 AND A[5]AND a6avail1 AND A[6]; |
| | | a6avail2 := B(6) NOR C[6]; |

LOGIC SECTION
FOR GENERAL DYNAMIC EMBODIMENT

| | | |
|---|---|---|
| | | a6.a6avial2 := (a1.a1avail1 OR a2.a2avail OR a3.avail1 OR NOT A[4]) AND a4.a4avail1 OR a5.a5avail1 OR NOT A[5] AND a6.a6avail; |
| C[7] | := | (NOT a1.a1avail1) AND (NOT a2.a2avail1) AND (NOT 3.a3avail1) AND (NOT a4.a4avail1) AND (NOT a5.a5avail1) AND (NOT a6.a6avail1) AND a7avail1 AND A[7]; |
| | | a7avail2 := B[7] NOR C[7]; |
| | | a7.a7avail2 := (a1.a1avail1 OR a2.a2avail1 OR a3.a3avail1 OR a4.a4avail1 OR a5.a5avail1 OR a6.a6avail1 OR NOT A[5]) AND a7.a7avail1; |
| C[8] | := | (NOT a1.a1avail1) AND (NOT a2.a2avail1) AND (NOT 3.a3avail1) AND (NOT a4.a4avail1) AND (NOT a5.a5avail1) AND (NOT a6.a6avail1) AND (NOT a7avail1) AND a8avail1 AND A[8]; |
| | | a8avail2 := B[8] NOR C[8]; |
| | | a8.a8avail2 := (a1.a1avail1 OR a2.a2avail1 OR a3.a3avail1 OR a4.a4avail1 OR a5.a5avail1 OR a6.a6avail1 OR a7.a7avail1 OR NOT A[5]) AND a8.a8avail1; |
| C[9] | := | (NOT a1.a1alvail1) AND (NOT a2.a2avail1) AND (NOT a3.a3avail1) AND (NOT a4.a4avail1) AND (NOT a5.a5avail1) AND (NOT a6.a6avail1) AND (NOT a7.a7avail1) AND (NOT a8.a8avail1) AND a9avail1 AND A[9]; |
| | | a9avail2 := B[9] NOR C[9]; |
| | | a9.a9avail2 := (a1.a1avail1 OR a2.a2avail1 OR a3.a3avail1 OR a4.a4avail1 OR a5.a5avail1 OR a6.a6avail1 OR a7.a7avail1 OR a8.a8avail1 NOT A[5]) AND a9.a9avail1; |
| C[10] | := | (NOT a1.a1avail1) AND (NOT a2.a2avail1) AND (NOT a3.a3avail1) AND (NOT a4.a4avail1) AND (NOT a5.a5avail1) AND (NOT a6.a6avail1) AND (NOT a7.a7avail1) AND (NOT a8.a8avail1) AND (NOT a9.a9avail1) AND a10avail1 AND A[10]; |
| | | a10avail2 := B[10] NOR C[10] ; |
| | | a10.a10avail2 := (a1.a1avail1 OR a2.a2avail1 OR a3.a3avail1 OR a4.a4avail1 OR a5.a5avail1 OR a6.a6avail1 OR a7.a7avail1 OR a8.a8avail1 OR a9.a9avail1 OR NOT A[5]) AND a10.a10avail1; |
| C[11] | := | (NOT a1.a1avail1) AND (NOT a2.a2avail1) AND (NOT a3.a3avail1) AND (NOT a4.a4avail1) AND (NOT a5.a5avail1) AND (NOT a6.a6avail1) AND (NOT a7.a7avail1) AND (NOT a8.a8avail1) AND (NOT a9.a9avail1) AND (NOT a10avail1) AND A[11]; |
| | | a11avail2 := B[11] NOR C[11 ; |
| | | a11.a11avail2 := (a1.a1avail1 OR a2.a2avail1 OR a3.a3avail1 OR a4.a4avail1 OR a5.a5avail1 OR a6.a6avail1 OR a7.a7avail1 OR a8.a8avail1 OR a9.a9avail1 OR a10.a10avail1 or NOT [A5]) AND a10.a10avail1; |
| . . . | | |
| . . . | | |
| C[23] | := | (NOT a1.a1avail1) AND (NOT a2.a2avail1) AND (NOT a3.a3avail1) AND . . . (NOT a22.a22avail1) AND a23avail AND A[23]; |
| | | a23avail2 := B[23] NOR C[23]; |
| D[0] | := | 0; |
| D[1] | := | 0; |
| D[2] | := | a2.a2avail2; |
| D[3] | := | (NOT a2.a2avail2) AND A[3] AND a3avail2; |
| | | a3avail3 := NOT D[3]; |
| | | a3.a3avail3 := (a2.a2avail2 OR NOT A[3]) AND a3.a3avail2; |
| D[4] | := | (NOT a2.a2avail2) AND (not a3.a3avail2) AND A[4] AND a4avail2; |
| | | a4avail3 := NOT (B[4] OR C[4] OR D[4]); |
| | | a4.a4avail3 := (a2.a2avail2 OR a3.a3avail2 NOT A[3]) AND a4.a4avail2; |
| D[5] | := | (NOT a2..a2avail2) AND (not a3.a3avail2) AND (NOT a4.a4avail2) AND A[5] AND a5abial2; |
| | | a5abail3 := NOT (B[5] OR C[5] OR D[5]); |
| | | a5.a5avail3 := (a2.a2avail2 OR a3.a3avail2 OR a4.a4avail2 NOT A[3]) AND a5.a5avail2; |
| D[6] | := | (NOT a2.a2avail2) AND (NOT a3.a3avail2) AND (NOT a4.a4avail2) AND NOT a5.a5avail2) AND A[6] and a6avail2; |
| | | a6avail3 := NOT (B[6] OR C[6] OR D[6]; |
| | | a6.a6avail3 := (a2.a2avail2 OR a3.a3avail2 OR a4.a4avail2 OR a5.a5avail2 OR NOT A[3]) AND a6.a6avail2; |
| D[7] | := | (NOT a2.a2avail2) AND (NOT a3.a3avail2) AND (NOT a4.a4avail2) AND (NOT a5.a5avail2) AND (NOT a6.a6avail2) AND A[7] and A7avail2; |
| | | a7avail3 := NOT (B[7] OR C[7] OR D[7]); |
| | | a7.a7avail3 := (a2.a2avail2 OR a3.a3avail2 OR a4.a4avail2 OR a5.a5avail2 OR a6.a6avail2 OR NOT A[3] AND a7.a7avail2; |
| D[8] | := | (NOT a2.a2avail2) AND (NOT a3.a3avail2) AND (NOT a4.a4avail2) AND (NOT a5.a5avail2) AND (NOT a6.a6avail2) AND (NOT a7.a7avail2) AND A[8] ANDA8avail2; |
| | | a8avail3 := NOT (B[8] OR C[8] OR D[8]); |
| | | a8.a8avail3 := (a2.a2avail2 OR a3.a3avial2 OR a4.a4avail2 OR a5.a5avail2 OR a6.a6avail2 OR a7.a7avail2 OR NOT A[3]) AND a8.a8avail2; |

LOGIC SECTION
FOR GENERAL DYNAMIC EMBODIMENT

| | | |
|---|---|---|
| D[9] | := | (NOT a2.a2avial2) AND (NOT a3.a3avail2) AND (NOT a4.a4avail2) AND (NOT a5.a5avail2) AND (NOT a6.a6avail2) AND (NOT a7.a7avail2) AND (NOT a8.a8avail2) AND A[9] and A9avail2; |
| | | a9avail3 := NOT (B[9] OR C[9] D[9]); |
| | | a9.a9avial3 := (a2.a2avail2 OR a3.a3avail2 OR a4.a4avail2 OR a5.a5avail2 OR a6.a6avail2 OR a7.a7avail2 OR a8.a8avail2 OR NOT A[3]) AND a9.a9avail2; |
| D[10] | := | (NOT a2.a2avail2) AND (NOT a3.a3avail2) AND (NOT a4.a4avail2) AND (NOT a5.a5avail2) AND (NOT a6.a6avail2) AND (NOT a7.a7avail2) AND (NOT a8.a8avail2) AND a9.a9avail2) AND A[10] AND A10avail2; |
| | | a10avail3 := NOT (B[10] OR C[10] OR D[10]); |
| | | a10.a10avail3 := (a2.a2avail2 OR a3.a3avail2 OR a4.a4avail2 OR a5.a5avail2 OR a6.a6avail2 OR a7.a7avail2 OR a8.a8avail2 OR a9.a9avail2 OR NOT A[3]) AND a10.a10avail2; |
| D[11] | := | (NOT a2.a2avail2) AND (NOT a3.a3avail2) AND (NOT a4.a4avail2) AND (NOT a5.a5avail2) AND (NOT a6.a6avail2) AND (NOT a7.a7avail2) AND (NOT a8.a8avail2) AND (NOT a9.a9avail2) AND (NOT a10.10avail2) AND A[11] AND a11avail2; |
| | | a11avail3 := NOT (B[11] OR C[11] OR D[11]); |
| | | a11.a11avail3 := (a2.a2avail2 OR a3.a3avail2 OR a4.a4avail2 OR a5.a5avail2 OR a6.a6avail2 OR a7.a7avail2 OR a8.a8avail2 OR a9.a9avail2 OR a10.a10avail2 OR NOT A[3]) AND a11.a11avail2; |
| . . . | | |
| . . . | | |
| D[23] | := | (NOT a2.a2avail2) AND (NOT a3.a3avail2) AND . . . (NOT a22.a22avail2) AND A[23] AND a23avail2; |
| | | a23avail3 := NOT (B[23] OR C[23] OR D[23]); |
| E[0] | := | 0 |
| E[1] | := | 0 |
| E[2] | := | 0 |
| E[3] | := | a3.a3avail3 |
| E[4] | := | (NOT a3.a3avail3) AND A[4] AND a4avail3 |
| E[5] | := | (NOT a3.a3avail3) AND (NOT a4.a4avail3) AND A[5] AND a5avail3; |
| E[6] | := | (NOT a3.a3avail3) AND (NOT a4.a4avail3) AND (NOT a5.a5avail3) AND A[6] AND a6avail3 |
| E[7] | := | (NOT a3.a3avail3) AND (NOT a4.a4avail3) AND (NOT a5.a5avail3) AND (NOT a6.a6avail3) AND A[7] AND a7avail3; |
| E[8] | := | (NOT a3.a3avail3) AND (NOT a4.a4avail3) AND (NOT a5.a5avail3) AND (NOT a6.a6avail3) AND (NOT a7.a7avail3) AND A[8] AND a8avail3; |
| E[9] | := | (NOT a3.a3avail3) AND (NOT a4.a5avail3) AND (NOT a5.a5avail3) AND (NOT a6.a6avail3) AND (NOT a7.a7avail3) AND (NOT a8.a8avail3) AND A[9] |
| AND | | 9avail3; |
| E[10] | := | (NOT a3.a3avail3) AND (NOT a4.a4avail3) AND (NOT a5.a5avail3) AND (NOT a6.a6avail3) AND (NOT a7.a7avail3) AND (NOT a8.a8avail3) AND (NOT a9.a9avail3) AND A[10] AND a10avail3; |
| E[11] | := | NOT a3.a3avail3) AND (NOT a4.a4avail3) AND (NOT a5.a5 avail3) AND (NOT a6.a6avail3) AND (NOT a7.a7avail3) AND (NOT a8.a8avail3) AND (NOT a9.a9avail3) AND (NOT a10.10avail3) AND A[11] AND a11avail3; |
| . . . | | |
| . . . | | |
| E[23] | := | (NOT a3.a3avail2) AND (NOT a4.a4avail3) AND . . . (NOT a22.a22avail3) AND A[23] AND a23avail3; |
| WrRSEntry | := | B OR C OR D OR E |
| MaskRS Entry | := | NOT WrSEntry; |
| A | := | DeallocVec AND AlMaskRSEntry; |

VII. ALTERNATE EMBODIMENTS

The present invention also includes a variety of alternate embodiments for searching the deallocation vector 40 that are based on the general static and general dynamic embodiments as discussed above and in addition: (1) divide the deallocation vector 40 into separate sections and process each section independently in parallel; (2) introduce a rotating (alternating) priority pointer to a position within the deallocation vector for each allocation cycle; (3) recognize only consecutive vacancies within the deallocation vector; and (4) variations including one or more of the above.

FIG. 9A illustrates an alternative embodiment of the present invention wherein, for each allocation cycle, the allocation vector 40 is first split into two separate portions 905a and 905b and each portion is simultaneously processed by blocks 910 to simultaneously generate pairs of enable vectors. Provided the reservation station buffer is large enough, this embodiment will operate equally well compared to the general embodiments but requires less hardware and circuit complexity. Block 910 may be of either the general static or dynamic implementations as discussed above.

Portion 905a consists of the first half of the bits (0 to 11) and portion 905b consisting of the second half (bits 12 to 23). Processing block 910 represents the static or the dynamic embodiment of the present invention, but scaled down to accept an input of a 12 bit deallocation vector. Given the detailed discussion of both embodiments above, blocks 910 could be devised by one of ordinary skill in the art and are not reiterated herein. In such a case, the bitmap vectors as shown in FIG. 3 are half the size (due to the small deallocation vector length) and the three sections (e.g., 40a, 40b, and 40c) of the deallocation vector are also be half the size. The resultant output of each process block 910 are two enable vectors of 24 bits each (0 to 23) as shown in FIG. 9B. Therefore, portion 905a can be generated simultaneously with portion 905b by both processing blocks 910 as shown. Enable vectors 82 and 84 are then processed simultaneously with vectors 86 and 88. In the end, four enable vectors 82, 84, 86, and 88 are produced. It is appreciated that each processing block 910 may generate four enable vectors, but only the first two enable vectors per block contain a bit set. The enable vectors are then used to enable storage of instruction information into the reservation station 30 as discussed with reference to FIG. 5 for the set of instructions allocated within the current allocation cycle.

FIG. 9B illustrates another embodiment of the present invention but the deallocation vector 40 is divided into four separate sections (e.g., 920a, 920b, 920c and 920d) with each section containing a fourth of the bits of the original deallocation vector. Each section is then fed into a separate processing logic 910' which is the general static or the general dynamic embodiment scaled appropriately to receive an input deallocation vector of only 6 bits. The four separate sections (920a–920d) are then processed simultaneously. Given the detailed discussion of both embodiments above, blocks 910' could be devised by one of ordinary skill in the art. Since each section is processed simultaneously, four deallocation vectors are generated at the same time. The result generated, for each, is a single 24 bit enable vector. Section 920a generates enable vector 82, section 920b generates enable vector 84, section 920c generates enable vector 86 and section 930d generates enable vector 88. The enable vectors are then used to enable storage of instruction information into the reservation station 30 according to the circuit of FIG. 5.

It is appreciated, that for the embodiments of FIG. 9A and FIG. 9B, if all of the 1s are located within a given portion and no 1s are located within another portion, then there will not be sufficient enable vectors generated having a bit set therein. In such a case, the microprocessor 101 will stall the issue units of the in-order cluster 10 until enough vacancies become available.

In another embodiment, the deallocation vector may be divided into three separate sections and the issue unit generates only three instructions maximum for a given allocation cycle. In such case, each processing block 910 would accept a section of vector 40 (e.g., a third) and generate therefrom a single enable vector. Three enable vectors would be generated for a given allocation cycle to store instruction information for the set of three instructions issued in parallel.

FIG. 10A illustrates an alternate embodiment of the present invention that utilizes a rotating priority pointer or "head" pointer that may update upon each allocation cycle. As discussed with reference to the general embodiments, the vacancy search approach selects the first four "1" from the top of the deallocation vector for each allocation cycle. However, the "top" (e.g., the start priority bit) of the deallocation vector 40 is an arbitrary position for the priority pointer and the vacancy search approach can start at different bits (e.g., varied start priority bits) within the deallocation vector. For instance, FIG. 10A illustrates the vacancy search approach that starts at bit 0 and locates the next four (or fewer) vacancies ("1s") within the deallocation vector 40. The last of the vacancies being located at bit 16. Instead of an arbitrary position, the "top" may also be derived from a procedure (e.g., based on the last entry allocated from a previous stage, etc.).

Another vacancy search approach starts at start priority bit 17 and finds the next four 1s set, and may "roll" over from bit 23 to bit 0 in this search. The priority pointer for subsequent allocation cycles can be programmed to begin, for a given deallocation vector 40, where the last 1 (e.g., vacancy) was found in the search of a previous allocation cycle. For instance, with reference to FIG. 10A, assume the priority pointer was at bit 0 and the vacancy search found four 1s, the last 1 being located within entry 16. The priority pointer would then be moved from bit 0 to bit 17 for the next search of the deallocation vector the next allocation cycle. During this next allocation cycle, the deallocation vector 40 is searched for 1s starting at bit 17 and moving downward and around (e.g., bits 17–23 and 0–16 are searched in order of priority). Assuming the last of the four 1s is located in bit 3, the priority pointer would be set to bit 4 for the next allocation cycle. For each allocation cycle the priority pointer is altered.. It is appreciated that one of ordinary skill in the art, given the disclosure of the general static and dynamic embodiments, could scale the logic so that a priority pointer is so implemented in accordance with the circuit of FIG. 5.

The use of a rotating priority pointer (as shown in FIG. 10A) is useful because it may help reduce "eddy" effects (e.g., an instruction not scheduled over an extended period of time) and more uniformly allocate instructions across the entire reservation station 30. As the reservation station increases in size, the use of rotating priority pointers become more advantageous because the possibility of generating "eddy" effects increases (e.g., instructions are constantly allocated within the upper portion of the buffer resource and the lower portion is unused). By use of a rotating head pointer, the allocation matches closer to a FIFO and saves the resource buffer from having to keep track of the relative ages of the entries for dispatch. It is appreciated that the use of a rotating priority pointer may also be used in conjunction with any of the embodiments as discussed with reference to FIG. 9A or FIG. 9B as discussed above wherein each vector section processed in parallel (e.g., 920a–920d) may utilize a same or different priority pointer.

FIG. 10B illustrates an embodiment of the present invention that utilizes a randomly assigned priority pointer for each allocation cycle. A new priority pointer (and thus a new start priority bit) is determined, based on a random approach, for each cycle that the deallocation vector 40 is interrogated for vacant entries. There are a number of well known circuits that can be used consistent with the present invention for generating random indices. During a first allocation cycle the vacancy search approach searches from bit 2. For a next allocation cycle, the priority starts from bit 19. For a next allocation cycle, the priority starts from bit 12. For each of the above, the search goes down the vector 40 in priority and around (e.g., rolls over through zero) to locate four (or fewer) 1s.

FIG. 10C illustrates a step priority pointer embodiment wherein the priority pointer is updated by one for each allocation cycle. For instance, the priority pointer starts at bit 0 for a given clock cycle, then moves to bit 1 for a next cycle, then to bit 2 for a next and then to bit 3 for the next allocation cycle, and so on. The priority pointer can also be incremented by two or three or four each clock cycle within the scope of this embodiment. Both,the random priority pointer and the step priority pointer embodiments may be used in conjunction with the embodiments of the present invention as discussed with reference to FIG. 9A and FIG. 9B wherein each vector portion may utilize a same or different priority pointer. For all the embodiments as discussed with reference to FIG. 10A, FIG. 10B, and FIG. 10C, the enable vectors generated are used to store instruction information into the reservation station 30 as discussed with reference to FIG. 5.

FIG. 11 illustrates an embodiment of the present invention that divides the deallocation vector 40 into two separate portions, as shown portion 1105 and portion 1107, but each portion consists of the even entries and the odd entries, respectively of vector 40. This is an interleaved split because the resultant portions are actually interleaved portions of the original deallocation vector 40 for each allocation cycle. As shown, the even entries 0, 2, 4, 6, 8, . . . , 22 are found within vector portion 1105 and the odd entries 1, 3, 5, 7, 9, . . . , 23 are found within the vector portion 1107. Each vector portion is then processed by the present invention vacant entries location 910. This processes is similar to the general static or dynamic embodiments but scaled down to accept a deallocation vector half the size of deallocation vector 40. The output of the block 910 that accepts vector portion 1105 are two separate 24 bit enable vectors 82 and 84. The output of the block 910 that accepts vector portion 1107 are two separate 24 bit enable vectors 86 and 88. Enable vectors 82, 84, 86, and 88 are then used to enable vacancies of the RS 30 to accept data associated with a set of instructions processed within the allocation cycle.

FIG. 12 is an embodiment of the present invention utilizing the general static and dynamic embodiments but is further drawn to locating predetermined number of vacant entries within deallocation vector 40 that are consecutive. This embodiment is similar to the general embodiments, but the vacancy location approach only recognizes vacancies that are consecutive. For instance, FIG. 12 illustrates a deallocation vector 40 and the search approach is designed to locate four consecutive 1s, such as portion 1201. The microprocessor 101 of this embodiment will stall the issuance of new operations until the deallocation vector provides four consecutive 1s in the deallocation vector for a given allocation cycle. Another embodiment, also shown in FIG. 12, locates a pair of consecutive 1s 1202 of a deallocation vector 40. Again, the microprocessor 101 of this embodiment will stall the issue units until sufficient pairs of vacancies are located to allocate to a current set of operations to the reservation station.

These embodiments as shown in FIG. 12 are especially useful within a large reservation station wherein it is advantageous to consecutively allocate in order operations. Recall that operations allocated to the reservation station 30 are received in order from the in-order cluster 10. It is appreciated that the embodiment that locates consecutive pairs of 1s may advantageously be used in conjunction with an embodiment of the present invention as discussed with respect to FIG. 9A or FIG. 9B. Further, this embodiment may also be used in conjunction with any of the rotating, random or step priority pointer embodiments as disclosed with reference to FIG. 10A, FIG. 10B, or FIG. 10C.

Various embodiments of the present invention, for locating vacant entries of a reservation station, within a single clock cycle, by examining a deallocation vector, are thus described. While the present invention has been described in particular embodiments, it should be appreciated that the present invention should not be construed as limited by such embodiments, but rather construed according to the below claims.

What is claimed is:

1. An apparatus for allocating vacancies of a buffer resource to instruction information relating to instructions for storage into said buffer resource of a pipelined superscalar microprocessor, said apparatus comprising:

a deallocation vector for indicating vacancies within said buffer resource;

circuitry for separating said deallocation vector into a first vector portion and a second vector portion;

vacancy location circuitry coupled to receive a vector portion of either said first vector portion or said second vector portion and generating for a current allocation cycle at least one enable vector indicating a vacant entry of said buffer resource for storage of instruction information for one of said instructions, said vacancy location circuitry comprising:

processing logic for examining separate portions of said vector portion for vacancies and for each of said separate portions examined, generating a plurality of bitmaps associated with each separate portion; and multiplexing logic coupled to receive said bitmaps for multiplexing each of said bitmaps based on a priority reference bit pointer of said vector portion and generating therefrom said enable vector.

2. An apparatus as described in claim 1 further, comprising logic for updating said priority reference bit pointer based on a last vacancy located within said vector portion from a previous allocation cycle.

3. An apparatus as described in claim 1 further comprising logic for updating said priority reference bit pointer by incrementing said priority reference bit pointer by a predetermined amount upon each allocation cycle.

4. An apparatus as described in claim 1 further comprising logic for updating said priority reference bit pointer according to a random assignment upon each allocation cycle.

5. An apparatus as described in claim 1 wherein said vacancy location circuitry comprises circuitry that recognizes only consecutive vacancies within said vector portion.

6. An apparatus as described in claim 1 wherein said circuitry for separating comprises:

circuitry for generating said first vector portion wherein said first vector portion corresponds to only even bits of said deallocation vector; and circuitry for generating said second vector portion wherein said second vector portion corresponds to only odd bits of said deallocation vector.

7. An apparatus for allocating vacancies of a buffer resource to instructions and instruction data within a pipelined superscalar microprocessor, said apparatus comprising:

a deallocation vector for indicating vacancies within said buffer resource for a current allocation cycle;

circuitry for separating said deallocation vector into a first vector portion and a second vector portion;

first vacancy location circuitry coupled to receive said first vector portion and generating therefrom a first enable vector and a second enable vector for said current allocation cycle, said first and said second enable vector each indicating an entry into said resource buffer for storage of instruction information relating to a first instruction and a second instruction, respectively; and second vacancy location circuitry, operable simultaneous with said first vacancy location circuitry, coupled to receive said second vector portion and generating therefrom a third enable vector and a fourth enable vector, said third and said fourth enable vector each indicating an entry into said resource buffer for storage of instruction information relating to a third instruction and a fourth instruction, respectively.

8. An apparatus as described in claim 7 further comprising storage circuitry for storing said instructions and instruction information for said first, second, third and forth instruction into individual entries of said resource buffer based on said first, said second, said third, and said fourth enable vector.

9. An apparatus as described in claim 7 wherein said first vacancy location circuitry comprises:

processing logic for examining separate portions of said first vector portion for vacancies and for each of said separate portions examined, generating a plurality of bitmaps, each bitmap associated with a separate instruction of said instructions; and multiplexing logic for multiplexing each of said bitmaps based on a priority reference bit of said first vector portion and generating therefrom said first enable vector and said second enable vector.

10. An apparatus as described in claim 9 wherein said second vacancy location circuitry comprises:

processing logic for examining separate portions of said second vector portion for vacancies and for each of said separate portions examined, generating a plurality of bitmaps, each bitmap associated with a separate instruction of said instructions; and multiplexing logic for multiplexing each of said bitmaps based on a priority reference bit of said second vector portion and generating therefrom said third enable vector and said fourth enable vector.

11. An apparatus as described in claim 7 wherein said buffer resource is a reservation station.

12. A computer system comprising:

a bus for providing a communication pathway;

a memory coupled to said bus for storing instructions and program information;

a user interface coupled to said bus for receiving information and for communicating information; and a pipelined superscalar processor coupled to said bus for executing instructions and processing data, said processor comprising allocation circuitry for allocating entries of a resource buffer for storage of instructions information relating a set of instructions into said buffer resource, said allocation circuitry comprising:

a deallocation vector for indicating vacant entries within said buffer resource;

circuitry for separating said deallocation vector into a first vector portion and a second vector portion;

vacancy location circuitry coupled to receive a vector portion of either said first vector portion or said second vector portion and generating for a current allocation cycle at least one enable vector indicating a vacant entry of said buffer resource for storage of instruction information relating to one of said instructions, said vacancy location circuitry comprising:

processing logic for examining separate portions of said vector portion for vacancies and for each of said separate portions examined, for generating a plurality of bitmaps associated with each separate portion; and multiplexing logic for multiplexing each of said bitmaps based on a priority reference bit pointer of said vector portion and generating therefrom said enable vector.

13. A computer system as described in claim 12 further comprising logic for updating said priority reference bit pointer based on a last vacancy located within said vector portion from a previous allocation cycle.

14. An apparatus as described in claim 12 further comprising logic for updating said priority reference bit pointer by incrementing said priority reference bit pointer by a predetermined amount for each allocation cycle.

15. A computer system as described in claim 12 further comprising logic for updating said priority reference bit pointer according to a random assignment for each allocation cycle.

16. A computer system as described in claim 12 wherein said vacancy location circuitry comprises circuitry that recognizes only consecutive vacancies within said vector portion.

17. A computer system as described in claim 12 wherein said circuitry for separating comprises:

circuitry for generating said first vector portion wherein said first vector portion corresponds to only even bits of said deallocation vector; and circuitry for generating said second vector portion wherein said second vector portion corresponds to only odd bits of said deallocation vector.

18. In a pipelined or superscalar microprocessor including an buffer resource, and a deallocation vector for indicating vacant entries within said buffer resource for storage of information relating to a set of issued instructions, an apparatus for allocating highest priority vacancies within said buffer resource, said apparatus comprising:

processing logic for examining separate portions of said deallocation vector for vacancies and for each issued instruction, generating for a given allocation cycle a set of bitmap vectors, said set of bitmap vectors comprising separate bitmap vectors corresponding to each of said separate portions of said deallocation vector;

multiplexing logic for multiplexing each of said bitmap vectors to generate an enable vector for each of said set of issued instructions, said enable vector indicating a vacant storage entry within said buffer resource, said multiplexing logic coupled to said processing logic, wherein said processing logic and said multiplexing logic process said deallocation vector based on a priority bit pointer to said deallocation vector; and logic for updating said priority bit pointer for individual allocation cycles.

19. An apparatus for allocating highest priority vacancies within said buffer resource as described in claim 18 further comprising enable logic for enabling vacant storage entries of said buffer resource to receive said issued instructions according to each enable vector, said enable logic coupled to receive each enable vector.

20. An apparatus for allocating highest priority vacancies within said buffer resource as described in claim 18 wherein said buffer resource is a reservation station.

21. An apparatus for allocating highest priority vacancies within said buffer resource as described in claim 18 wherein said logic for updating said priority bit pointer comprises logic for updating said priority reference bit pointer based on a last vacancy located within said deallocation vector from a previous allocation cycle.

22. An apparatus for allocating highest priority vacancies within said buffer resource as described in claim 18 wherein said logic for updating said priority bit pointer comprises logic for updating said priority reference bit pointer by incrementing said priority reference bit pointer by a predetermined amount for each allocation cycle.

23. An apparatus for allocating highest priority vacancies within said buffer resource as described in claim 18 wherein said logic for updating said priority bit pointer comprises logic for updating said priority reference bit pointer according to a random assignment for each allocation cycle.

24. An apparatus for allocating highest priority vacancies within said buffer resource as described in claim 18 wherein said processing logic comprises circuitry that recognizes only consecutive vacancies within said deallocation vector.

25. A computer system comprising:

a bus for providing a communication pathway;

a memory coupled to said bus for storing instructions and program information;

a user interface coupled to said bus for receiving information and for communicating information; and a pipelined superscalar processor coupled to said bus for executing instructions and processing data, said processor comprising allocation circuitry for allocating highest priority vacancies within a resource buffer for storage of a set of issued instructions, said allocation circuitry comprising:

processing logic for examining separate portions of said deallocation vector for vacancies and for each issued instruction, generating for a given allocation cycle a set of bitmap vectors, said set of bitmap vectors comprising separate bitmap vectors corresponding to each of said separate portions of said deallocation vector;

multiplexing logic for multiplexing each of said bitmap vectors to generate an enable vector for each of said set of issued instructions, said enable vector indicating a vacant storage entry within said buffer resource, said multiplexing logic coupled to said processing logic, wherein said processing logic and said multiplexing logic process said deallocation vector based on a priority bit pointer to said deallocation vector; and logic for updating said priority bit pointer for individual allocation cycles.

26. A computer system for allocating highest priority vacancies within said buffer resource as described in claim 25 further comprising enable logic for enabling vacant storage entries of said buffer resource to receive said issued instructions according to each enable vector, said enable logic coupled to receive each enable vector.

27. A computer system for allocating highest priority vacancies within said buffer resource as described in claim 25 wherein said buffer resource is a reservation station.

28. A computer system for allocating highest priority vacancies within said buffer resource as described in claim 25 wherein said logic for updating said priority bit pointer comprises logic for updating said priority reference bit pointer based on a last vacancy located within said deallocation vector from a previous allocation cycle.

29. A computer system for allocating highest priority vacancies within said buffer resource as described in claim 25 wherein said logic for updating said priority bit pointer comprises logic for updating said priority reference bit pointer by incrementing said priority reference bit pointer by a predetermined amount for each allocation cycle.

30. A computer system for allocating highest priority vacancies within said buffer resource as described in claim 25 wherein said logic for updating said priority bit pointer comprises logic for updating said priority reference bit pointer according to a random assignment for each allocation cycle.

31. A computer system for allocating highest priority vacancies within said buffer resource as described in claim 25 wherein said processing logic comprises circuitry that recognizes only consecutive vacancies within said deallocation vector.

32. Within a pipelined or superscalar microprocessor, a method of assigning vacant entries of a buffer resource for storage of instruction data relating to instructions, said method comprising the steps of:

receiving a deallocation vector indicating vacant entries of said buffer resource;

separating said deallocation vector into a first vector portion and a second vector portion;

receiving an input vector portion of either said first vector portion or said second vector and generating therefrom at least one enable vector indicating a vacant entry of said buffer resource for storage of instruction information for one of said instructions, said step of generating comprising the steps of:

examining separate portions of said input vector portion for vacancies and for each of said separate portions examined, generating for a given allocation cycle a plurality of bitmaps associated with each separate portion; and multiplexing said bitmaps based on a priority reference bit pointer of said vector portion and selecting one of said bitmaps to generate an enable vector therefrom corresponding to an instruction of said instructions.

33. A method of allocation as described in claim 32 further comprising the step of updating said priority reference bit pointer based on a last vacancy located within said vector portion from a previous allocation cycle.

34. A method of allocation as described in claim 32 further comprising the step of updating said priority reference bit pointer by incrementing said priority reference bit pointer by a predetermined amount for each allocation cycle.

35. A method of allocation as described in claim 32 further comprising the step of updating said priority reference bit pointer according to a random assignment for each allocation cycle.

36. A method of allocation as described in claim 32 wherein said step of separating comprises the steps of:

generating said first vector portion wherein said first vector portion corresponds to only even bits of said deallocation vector; and generating said second vector portion wherein said second vector portion corresponds to only odd bits of said deallocation vector.

37. A method of allocation as described in claim 32 wherein said step of examining separate portions of said vector portion comprises the step of recognizing only consecutive vacancies of said vector portion.

38. In a pipelined or superscalar microprocessor including a buffer resource, and a deallocation vector indicating vacant entries of said buffer resource for storage of a set of issued instructions, a method of allocating highest priority vacancies within said buffer resource to said set of issued instructions, said method comprising the steps of:

examining separate portions of said deallocation vector for vacancies and for each issued instruction generating a set of bitmap vectors, said set of bitmap vectors comprising different bitmap vectors corresponding to each of said separate portions of said deallocation vector;

multiplexing each of said bitmap vectors to generate an enable vector for each of said set of issued instructions, said enable vector for indicating a vacant storage location within said buffer resource, said step of multiplexing receiving information from said step of examining, wherein said step of examining and multiplexing process said deallocation vector based on a priority bit pointer to said deallocation vector; and updating said priority bit pointer for individual allocation cycles.

39. A method of allocating highest priority vacancies within said buffer resource as described in claim 38 further comprising the step of enabling vacant storage locations of said buffer resource to receive said issued instructions according to each enable vector generated by said step of multiplexing.

40. A method of allocating highest priority vacancies within said buffer resource as described in claim 38 wherein said buffer resource is a reservation station.

41. A method of allocating highest priority vacancies within said buffer resource as described in claim 38 wherein said step of updating said priority bit pointer comprises the step of updating said priority reference bit pointer based on a last vacancy located within said deallocation vector from a previous allocation cycle.

42. A method of allocating highest priority vacancies within said buffer resource as described in claim 38 wherein said step of updating said priority bit pointer comprises the step of updating said priority reference bit pointer by incrementing said priority reference bit pointer by a predetermined amount for each allocation cycle.

43. A method of allocating highest priority vacancies within said buffer resource as described in claim 38 wherein said step of updating said priority bit pointer comprises the step of updating said priority reference bit pointer according to a random assignment for each allocation cycle.

44. A method of allocating highest priority vacancies within said buffer resource as described in claim 38 wherein said step of examining comprises the step of recognizing only consecutive vacancies within said deallocation vector.

* * * * *

UNITED STATES PATENT AND TRADEMARK OFFICE
CERTIFICATE OF CORRECTION

PATENT NO. : 5,490,280
DATED : February 6, 1996
INVENTOR(S) : Gupta et al.

It is certified that error appears in the above-identified patent and that said Letters Patent is hereby corrected as shown below:

In column 1 at line 24 delete "Modem" and insert --Modern--

In column 1 at line 29 delete "perforated" and insert --performed--

In column 1 at line 36 delete "modem" and insert --modern--

In column 7 at line 67 delete "5parallel" and insert --parallel--

Signed and Sealed this

Twenty-ninth Day of July, 1997

Attest:

Attesting Officer

BRUCE LEHMAN
Commissioner of Patents and Trademarks